United States Patent
Ito et al.

(10) Patent No.: US 12,484,857 B2
(45) Date of Patent: Dec. 2, 2025

(54) BLOOD PRESSURE VALUE ANALYSIS SUPPORT APPARATUS, BLOOD PRESSURE VALUE ANALYSIS SUPPORT SYSTEM, AND BLOOD PRESSURE VALUE ANALYSIS SUPPORT METHOD

(71) Applicant: OMRON HEALTHCARE CO., LTD., Muko (JP)

(72) Inventors: Tatsunori Ito, Kyoto (JP); Shingo Yamashita, Kyoto (JP); Mitsuo Kuwabara, Kyoto (JP); Yuki Ota, Kyoto (JP); Ayako Kokubo, Kyoto (JP)

(73) Assignee: OMRON HEALTHCARE CO., LTD., Muko (JP)

( * ) Notice: Subject to any disclaimer, the term of this patent is extended or adjusted under 35 U.S.C. 154(b) by 1104 days.

(21) Appl. No.: 17/396,325

(22) Filed: Aug. 6, 2021

(65) Prior Publication Data

US 2021/0361243 A1  Nov. 25, 2021

Related U.S. Application Data

(63) Continuation of application No. PCT/JP2020/004818, filed on Feb. 7, 2020.

(30) Foreign Application Priority Data

Feb. 18, 2019 (JP) .................. 2019-026759

(51) Int. Cl.
*A61B 5/00* (2006.01)
*A61B 5/022* (2006.01)
*G16H 40/63* (2018.01)

(52) U.S. Cl.
CPC ............ *A61B 5/7221* (2013.01); *A61B 5/022* (2013.01); *G16H 40/63* (2018.01); *A61B 5/721* (2013.01);

(Continued)

(58) Field of Classification Search
CPC ....... A61B 5/7221; A61B 5/022; A61B 5/721; A61B 2562/0247; A61B 2562/043; G16H 40/63; G16H 50/30
See application file for complete search history.

(56) References Cited

U.S. PATENT DOCUMENTS

| 9,066,680 | B1 | 6/2015 | Al-Ali et al. |
| 2017/0303862 | A1* | 10/2017 | Nakamura ............. G16H 50/20 |
| 2021/0267471 | A1* | 9/2021 | Bonomi ................ A61B 5/1116 |

FOREIGN PATENT DOCUMENTS

| JP | 2008-142162 A | 6/2008 |
| JP | 2016-202345 A | 12/2016 |

(Continued)

OTHER PUBLICATIONS

English-language machine translation of WO-2017209134-A1 (Year: 2024).*

(Continued)

*Primary Examiner* — Andrey Shostak
(74) *Attorney, Agent, or Firm* — Oliff PLC

(57) ABSTRACT

A blood pressure value analysis support apparatus includes a one-beat reliability determination unit and section setting unit. The determination unit determines reliability of a blood pressure value for each beat including a first reliability and second reliability lower in reliability than the first based on information indicating disturbance. The section setting unit sets valid and invalid sections for the time-series data of blood pressure based on a reliability determination result. The section setting unit includes a section wherein the blood pressure value reliability for each beat is the first reliability in the valid section and includes a section wherein the blood pressure value reliability for each beat is the second reliability in the invalid section, for the time-series data of blood pressure. The section setting unit changes the invalid section (Continued)

when a length of a continuous period is less than a preset first threshold value to the valid section.

15 Claims, 26 Drawing Sheets

(52) U.S. Cl.
 CPC . *A61B 2562/0247* (2013.01); *A61B 2562/043* (2013.01)

(56) References Cited

FOREIGN PATENT DOCUMENTS

| | | | |
|---|---|---|---|
| JP | 2016-214563 A | 12/2016 | |
| JP | 2018-42606 A | 3/2018 | |
| JP | 2018-147442 A | 9/2018 | |
| JP | 2018-149182 A | 9/2018 | |
| WO | 2017/179701 A1 | 10/2017 | |
| WO | WO-2017209134 A1 * | 12/2017 | ........... A61B 5/0002 |
| WO | 2018/168805 A1 | 9/2018 | |

OTHER PUBLICATIONS

Apr. 14, 2020 Search Report issued in International Patent Application No. PCT/JP2020/004818.

* cited by examiner

Fig.20A

| | INDIVIDUAL DETERMINATION ITEM | | | | | RELIABILITY |
|---|---|---|---|---|---|---|
| | OUTLIER | BODY MOTION (LONG UNIT SECTION) | BODY MOTION (SHORT UNIT SECTION) | BLOOD PRESSURE LEVEL CHANGE | ATTACHMENT STATE DETERIORATION | |
| FIRST BLOOD PRESSURE OF ONE BEAT | PRESENT | ABSENT | ABSENT | ABSENT | ABSENT | LOW |
| SECOND BLOOD PRESSURE OF ONE BEAT | ABSENT | PRESENT | ABSENT | ABSENT | ABSENT | LOW |
| THIRD BLOOD PRESSURE OF ONE BEAT | ABSENT | ABSENT | PRESENT | ABSENT | ABSENT | LOW |
| FOURTH BLOOD PRESSURE OF ONE BEAT | ABSENT | ABSENT | ABSENT | PRESENT | ABSENT | LOW |
| FIFTH BLOOD PRESSURE OF ONE BEAT | ABSENT | ABSENT | ABSENT | ABSENT | PRESENT | LOW |
| SIXTH BLOOD PRESSURE OF ONE BEAT | ABSENT | ABSENT | ABSENT | ABSENT | ABSENT | HIGH |

Fig.20B

| | INDIVIDUAL DETERMINATION ITEM | | | | | RELIABILITY |
|---|---|---|---|---|---|---|
| | OUTLIER | BODY MOTION (LONG UNIT SECTION) | BODY MOTION (SHORT UNIT SECTION) | BLOOD PRESSURE LEVEL CHANGE | ATTACHMENT STATE DETERIORATION | |
| FIRST BLOOD PRESSURE OF ONE BEAT | PRESENT | ABSENT | ABSENT | ABSENT | ABSENT | LOW |
| SECOND BLOOD PRESSURE OF ONE BEAT | ABSENT | PRESENT | ABSENT | ABSENT | ABSENT | MIDDLE |
| THIRD BLOOD PRESSURE OF ONE BEAT | ABSENT | ABSENT | PRESENT | ABSENT | ABSENT | LOW |
| FOURTH BLOOD PRESSURE OF ONE BEAT | ABSENT | ABSENT | ABSENT | PRESENT | ABSENT | LOW |
| FIFTH BLOOD PRESSURE OF ONE BEAT | ABSENT | ABSENT | ABSENT | ABSENT | PRESENT | LOW |
| SIXTH BLOOD PRESSURE OF ONE BEAT | ABSENT | ABSENT | ABSENT | ABSENT | ABSENT | HIGH |

| VALID SECTION ID | SECTION START TIME OF VALID SECTION | SECTION END TIME OF VALID SECTION |
|---|---|---|
| 1 | 2018/12/1 21:00:01 | 2018/12/1 23:15:50 |
| 2 | 2018/12/1 23:17:20 | 2018/12/1 23:55:50 |
| ... | ... | ... |
| i | 2018/12/2 07:20:00 | 2018/12/2 08:00:03 |

| BLOOD PRESSURE ID OF ONE BEAT | MEASUREMENT TIME | RELIABILITY | BODY MOTION | BLOOD PRESSURE LEVEL CHANGE | OUTLIER | ATTACHMENT STATE DETERIORATION |
|---|---|---|---|---|---|---|
| 1 | 2018/12/1 21:00:01 | HIGH | ABSENT | ABSENT | ABSENT | ABSENT |
| 2 | 2018/12/1 21:00:02 | LOW | PRESENT | ABSENT | ABSENT | ABSENT |
| ... | ... | ... | ... | ... | ... | ... |
| i | 2018/12/2 08:00:03 | LOW | ABSENT | PRESENT | PRESENT | ABSENT |

BLOOD PRESSURE VALUE ANALYSIS SUPPORT APPARATUS, BLOOD PRESSURE VALUE ANALYSIS SUPPORT SYSTEM, AND BLOOD PRESSURE VALUE ANALYSIS SUPPORT METHOD

CROSS-REFERENCE TO RELATED APPLICATIONS

The present application is a continuation application of International Application No. PCT/JP2020/004818, filed Feb. 7, 2020, which claims priority to Japanese Patent Application No. 2019-026759, filed Feb. 18, 2019. The contents of these applications are incorporated herein by reference in their entirety.

BACKGROUND

Field

The present invention relates to a blood pressure value analysis support apparatus, a blood pressure value analysis support system, and a blood pressure value analysis support method.

Description of the Related Art

Conventionally, blood pressure is continuously measured for each beat. For example, Japanese Unexamined Patent Application Publication No. 2018-42606 discloses that an artery near a wrist of a subject is pressed to continuously measure blood pressure for each beat.

SUMMARY

According to a one aspect of the present invention, a blood pressure value analysis support apparatus according to an embodiment is a blood pressure value analysis support apparatus for supporting analysis of time-series data of blood pressure obtained from a measurement result of a sphygmomanometer, the apparatus including:
  a one-beat reliability determination unit that determines reliability of a blood pressure value for each beat, based on information indicating disturbance, in a state including at least a first reliability indicating that the blood pressure value for each beat should be used for analysis and a second reliability indicating that the reliability is lower than the first reliability for time-series data of blood pressure including the blood pressure value for each beat; and
  a section setting unit that sets a valid section representing a section which should be used for analysis and an invalid section representing a section which should not be used for analysis for the time-series data of blood pressure based on a determination result of the reliability of the blood pressure value for each beat,
  wherein, for the time-series data of blood pressure, the section setting unit includes a section in which the reliability of the blood pressure value for each beat is the first reliability in the valid section, and, on other hand, includes a section in which the reliability of the blood pressure value for each beat is the second reliability in the invalid section, and
  wherein the section setting unit changes the invalid section in which a length of a continuous period is less than a preset first threshold value to the valid section.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIGS. 20A and 20B are diagrams for explaining an operation of determining reliability from information indicating disturbance.

FIGS. 23A and 23B are diagrams illustrating an example of output data generated by the blood pressure value analysis support apparatus illustrated in FIG. 5.

DESCRIPTION OF THE EMBODIMENTS

Figure 1:
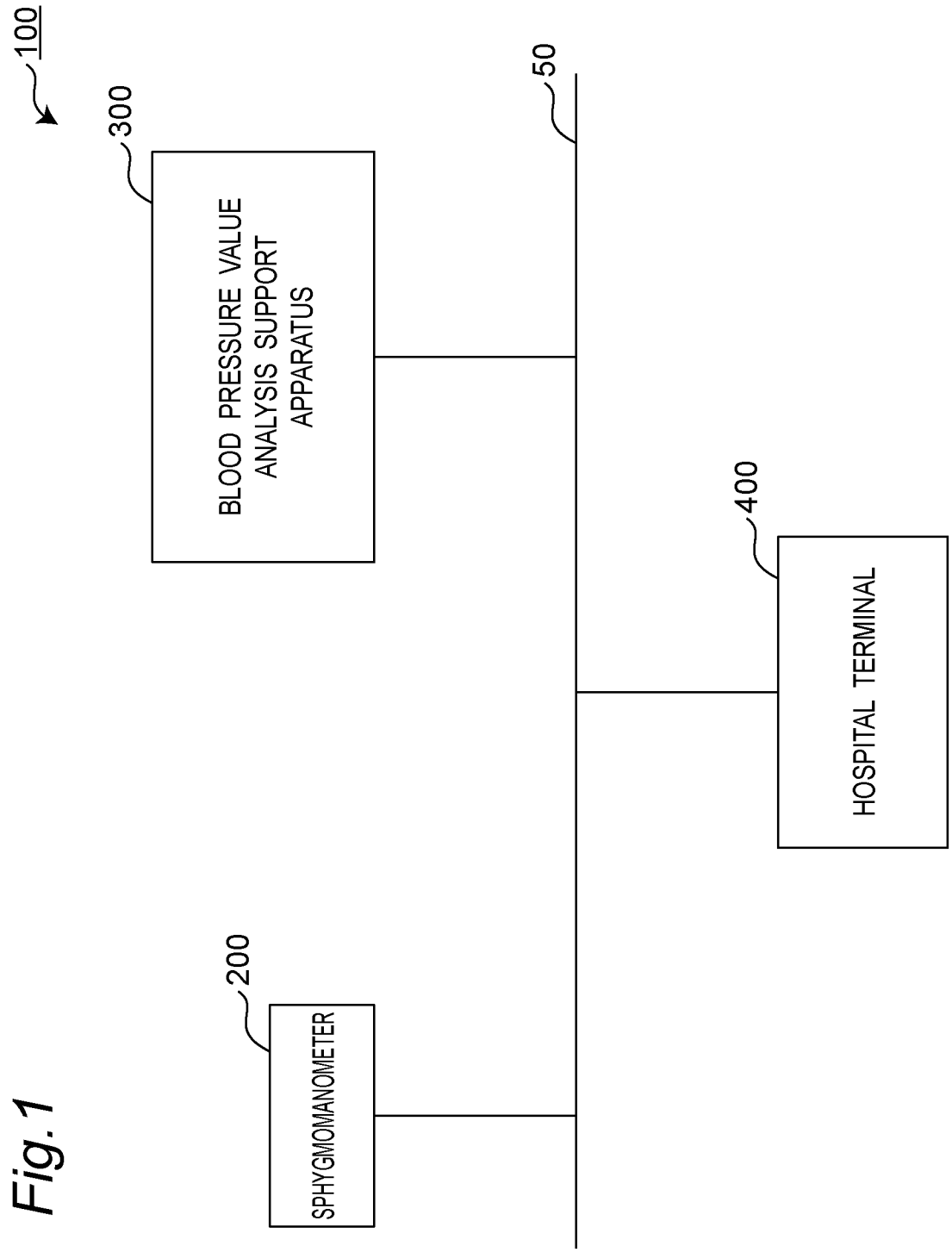
FIG. 1 is a diagram illustrating a schematic configuration of a blood pressure value analysis support system according to an embodiment.

The embodiments will now be described with reference to the accompanying drawings, wherein like reference numerals designate corresponding or identical elements throughout the various drawings.

Hereinafter, embodiments of the present invention will be described in detail with reference to the drawings.
(Schematic Configuration of Blood Pressure Value Analysis Support System 100)

FIG. 1 illustrates a schematic configuration of a blood pressure value analysis support system 100 according to an embodiment. The blood pressure value analysis support system 100 includes a tonometry-type sphygmomanometer 200, a blood pressure value analysis support apparatus 300, and at least one or more hospital terminals 400. The blood pressure value analysis support system 100 supports analysis of time-series data of blood pressure measured by the sphygmomanometer 200. As illustrated in FIG. 1, the sphygmomanometer 200, the blood pressure value analysis support apparatus 300, and the hospital terminal 400 are communicably connected to each other via a communication network 50. Here, the communication network 50 may be wireless or wired.
(Schematic Configuration of Sphygmomanometer 200)

Figure 2:
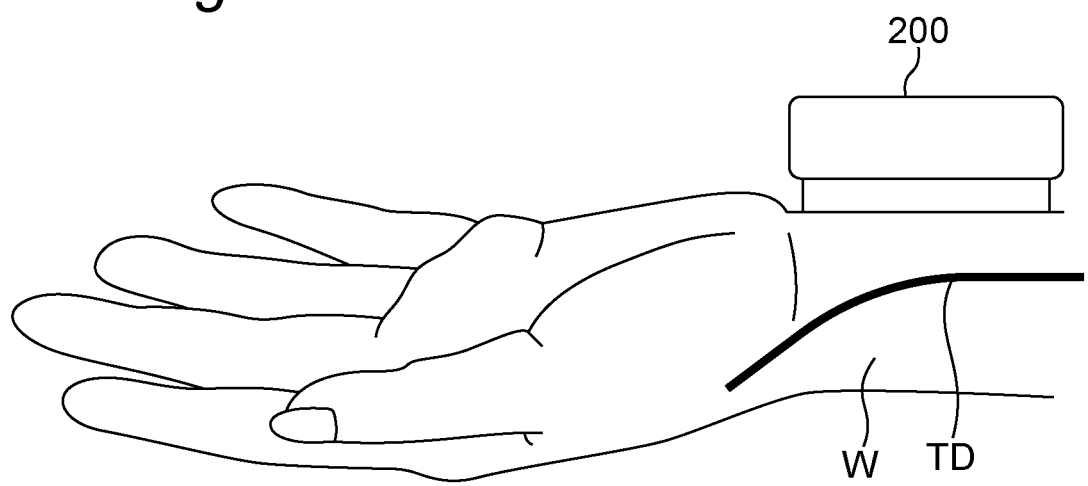
FIG. 2 is a diagram illustrating an attachment state of a sphygmomanometer included in the blood pressure value analysis support system.
Figure 3:
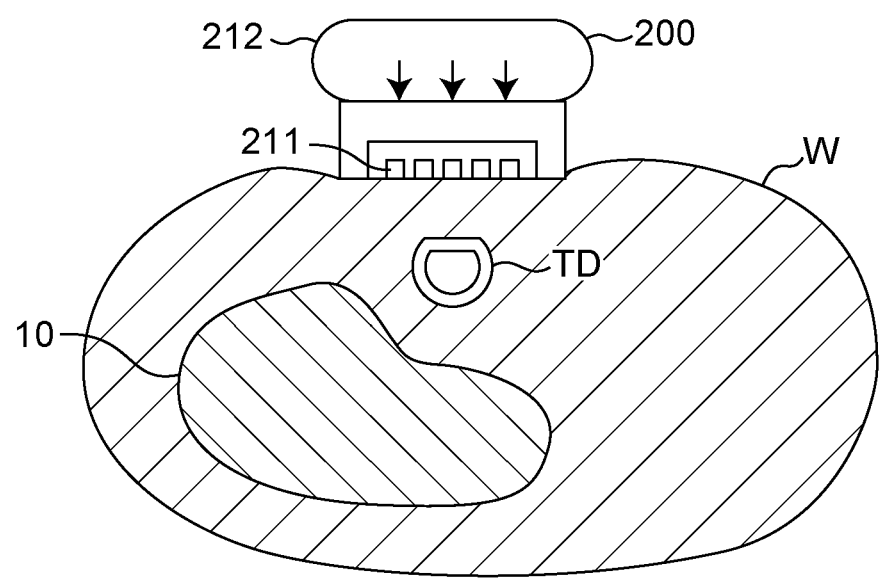
FIG. 3 is a cross-sectional view illustrating an attachment state of the sphygmomanometer included in the blood pressure value analysis support system.

The sphygmomanometer 200 illustrated in FIG. 1 includes, for example, a tonometry-type sphygmomanometer as disclosed in JP 2018-42606 A. FIG. 2 illustrates a state in which the sphygmomanometer 200 is attached to a wrist w of a subject. FIG. 3 is a cross-sectional view illustrating a state in which the sphygmomanometer 200 attached to the wrist w of the subject performs blood pressure measurement. The sphygmomanometer 200 illustrated in FIGS. 2 and 3 continuously measures a pressure pulse wave of a radial artery TD traveling along a radius 10 for each beat.

Figure 4:
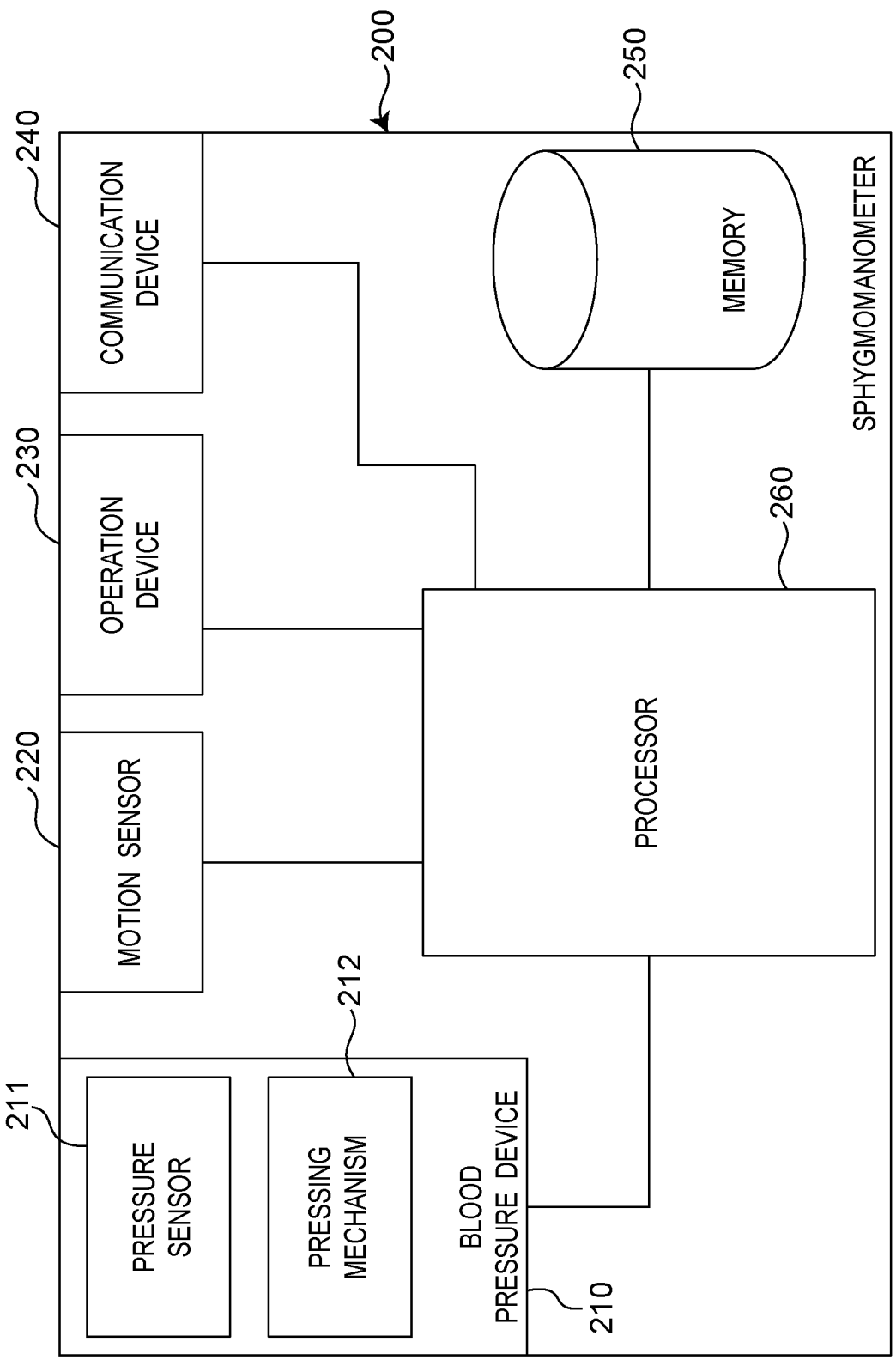
FIG. 4 is a diagram illustrating a schematic configuration of the sphygmomanometer included in the blood pressure value analysis support system.

FIG. 4 illustrates a schematic configuration of the sphygmomanometer 200. As illustrated in FIG. 4, the sphygmomanometer 200 includes a blood pressure device 210, a motion sensor 220, an operation device 230, a communication device 240, a memory 250, and a processor 260. In addition, the blood pressure device 210 includes a pressure sensor 211 and a pressing mechanism 212.

As illustrated in FIG. 3, the pressing mechanism 212 applies a pressing force to a measurement target site. When the pressing mechanism 212 applies a pressing force to the measurement target site, the pressure sensor 211 continuously detects the pressure pulse wave of the radial artery TD for each beat by tonometry. Tonometry is a method in which a blood vessel is flattened using the pressing mechanism 212, and the pressure sensor 211 measures a pressure pulse wave to determine blood pressure. When the blood vessel is regarded as a circular tube having a uniform thickness, a relational expression between an internal pressure (blood pressure) of the blood vessel and an external pressure (pressure of the pressure pulse wave) of the blood vessel can be derived according to Laplace's law in consideration of the blood vessel wall regardless of a flow of blood in the blood vessel and presence or absence of pulsation. Under a condition that the blood vessel is flattened on a pressed surface in this relational expression, the pressure of the pressure pulse wave and the blood pressure can be approximated to be equal by approximating radii of an outer wall and an inner wall of the blood vessel. Therefore, the pressure of the pressure pulse wave has the same value as the blood pressure. As a result, the sphygmomanometer 200 measures the blood pressure value at the measurement target site for each heartbeat. Then, the sphygmomanometer 200 generates time-series data of blood pressure in which a measurement time (time) is associated with the blood pressure, and outputs the time-series data to another device (for example, the blood pressure value analysis support apparatus 300).

In FIG. 4, the motion sensor 220 is a sensor that detects a motion of the sphygmomanometer 200. The motion sensor 220 includes, for example, an acceleration sensor and/or an angular velocity sensor. The operating device 230 receives an instruction (input) from a user. The operating device 230 includes, for example, a plurality of buttons. The communication device 240 transmits and receives various types of data. In the example of FIG. 1, the communication device 240 is connected to the communication network 50. The memory 250 stores various types of data. For example, the memory 250 can store a measurement value measured by the blood pressure device 210 (time-series data of blood pressure described above), a measurement result of the motion sensor 220, and the like. The memory 250 includes a random access memory (RAM), a read only memory (ROM), and the like. For example, various programs are changeably stored in the memory 250.

In this example, the processor 260 includes a central processing unit (CPU). For example, the processor 260 reads each program and each data stored in the memory 250. In addition, the processor 260 controls each of the units 210, 220, 230, 240, and 250 according to the read program to execute a predetermined operation (function). In addition, the processor 260 performs predetermined calculation, analysis, processing, and the like in the processor 260 according to the read program. Note that some or all of the functions executed by the processor 260 may be configured as hardware by one or more integrated circuits or the like.
(Schematic Configuration of Blood Pressure Value Analysis Support Apparatus 300)

Figure 5:
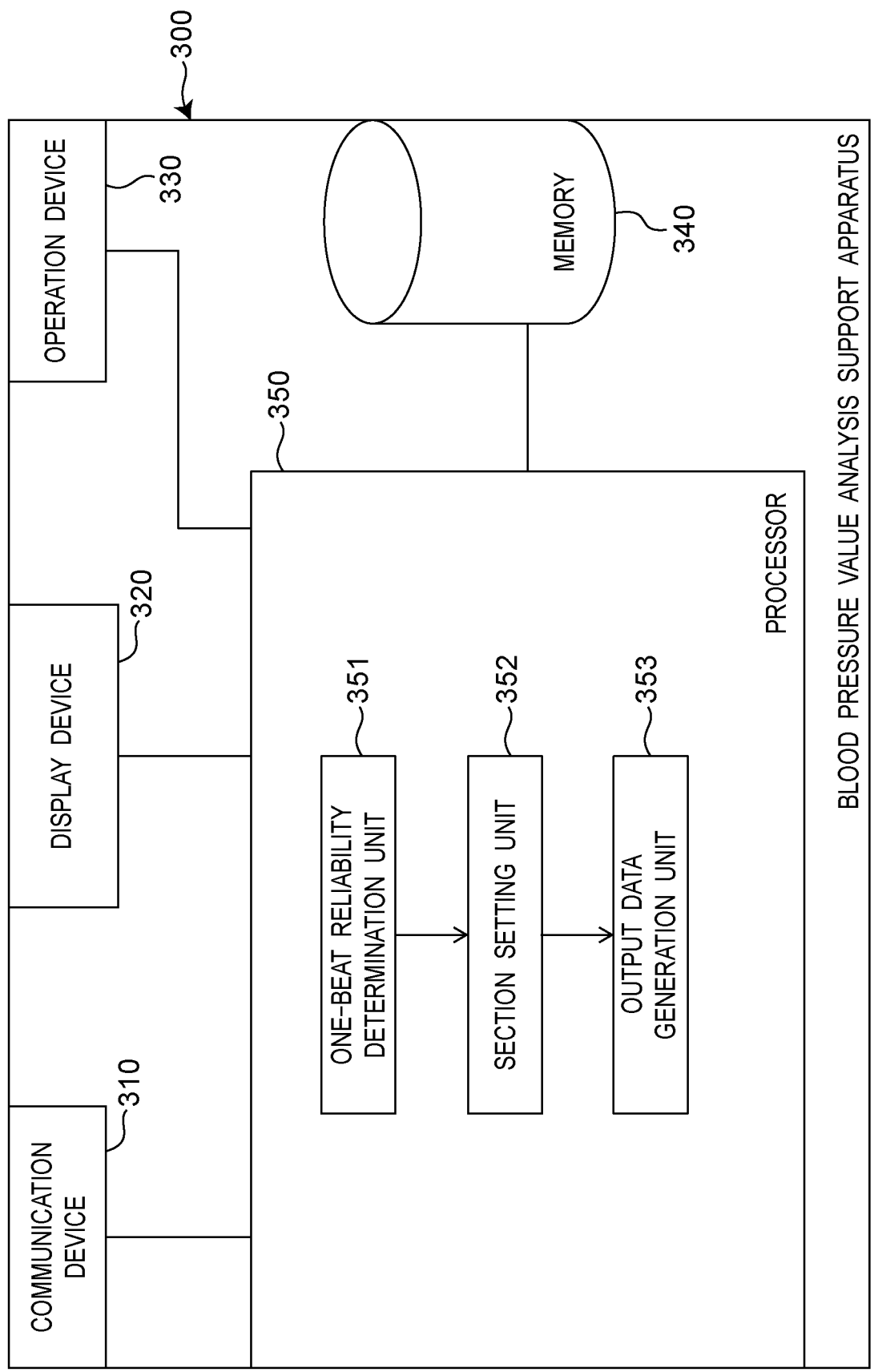
FIG. 5 is a diagram illustrating a schematic configuration of a blood pressure value analysis support apparatus included in the blood pressure value analysis support system.

The blood pressure value analysis support apparatus 300 according to the present embodiment supports analysis of the time-series data of blood pressure. Here, in the present embodiment, the time-series data of blood pressure is obtained from the measurement result of the sphygmomanometer 200. FIG. 5 illustrates a schematic configuration of the blood pressure value analysis support apparatus 300. As illustrated in FIG. 5, the blood pressure value analysis support apparatus 300 includes a communication device 310, a display device 320, an operation device 330, a memory 340, and a processor 350.

In FIG. 5, the communication device 310 transmits and receives various types of data. In the example of FIG. 1, the communication device 310 is connected to the communication network 50. The communication device 310 receives, for example, the time-series data of blood pressure and a detection result of the motion sensor 220 transmitted from the sphygmomanometer 200. In addition, the communication device 310 transmits various output data generated by the processor 350 in the blood pressure value analysis support apparatus 300 to the hospital terminal 400 or the like.

The display device 320 has a display screen that displays various images. The display device 320 can display, in a visually recognizable manner, results of various types of analysis and the like in the processor 350. Furthermore, the display device 320 can also display predetermined information in a visually recognizable manner according to a desire from the user via the operation device 330. For example, the display device 320 may display information (data) stored in the memory 340 in a visually recognizable manner. For example, a liquid crystal monitor or the like can be adopted as the display device 320.

The operating device 330 receives a predetermined operation (instruction) from the user. For example, the operation device 330 includes a mouse, a keyboard, and the like. Here, in a case where a touch panel monitor is employed as the display device 320, the display device 320 has not only a display function but also a function as the operation device 330.

The memory 340 stores various types of data. For example, the memory 340 can store a measurement value measured by the blood pressure device 210 (time-series data of blood pressure described above), a measurement result of the motion sensor 220, and the like. The memory 340 can also store various output data generated by the processor 350. The memory 340 includes a RAM, a ROM, and the like. For example, various programs are changeably stored in the memory 340.

The processor 350 includes a CPU in this example. For example, the processor 350 reads each program and each data stored in the memory 340. In addition, the processor 350 controls each of the units 310, 320, 330, and 340 according to the read program to execute a predetermined operation (function). In addition, the processor 350 performs predetermined calculation, analysis, processing, and the like in the processor 350 according to the read program. Note that some or all of the functions executed by the processor 350 may be configured as hardware by one or a plurality of integrated circuits or the like.

As illustrated in FIG. 5, the processor 350 according to the present embodiment includes a one-beat reliability determination unit 351, a section setting unit 352, and an output data generation unit 353 as functional blocks. Note that an operation of each of the blocks 351, 352, and 353 will be described in detail in the description of the operation to be described later.

(Schematic Configuration of Hospital Terminal 400)

Figure 6:
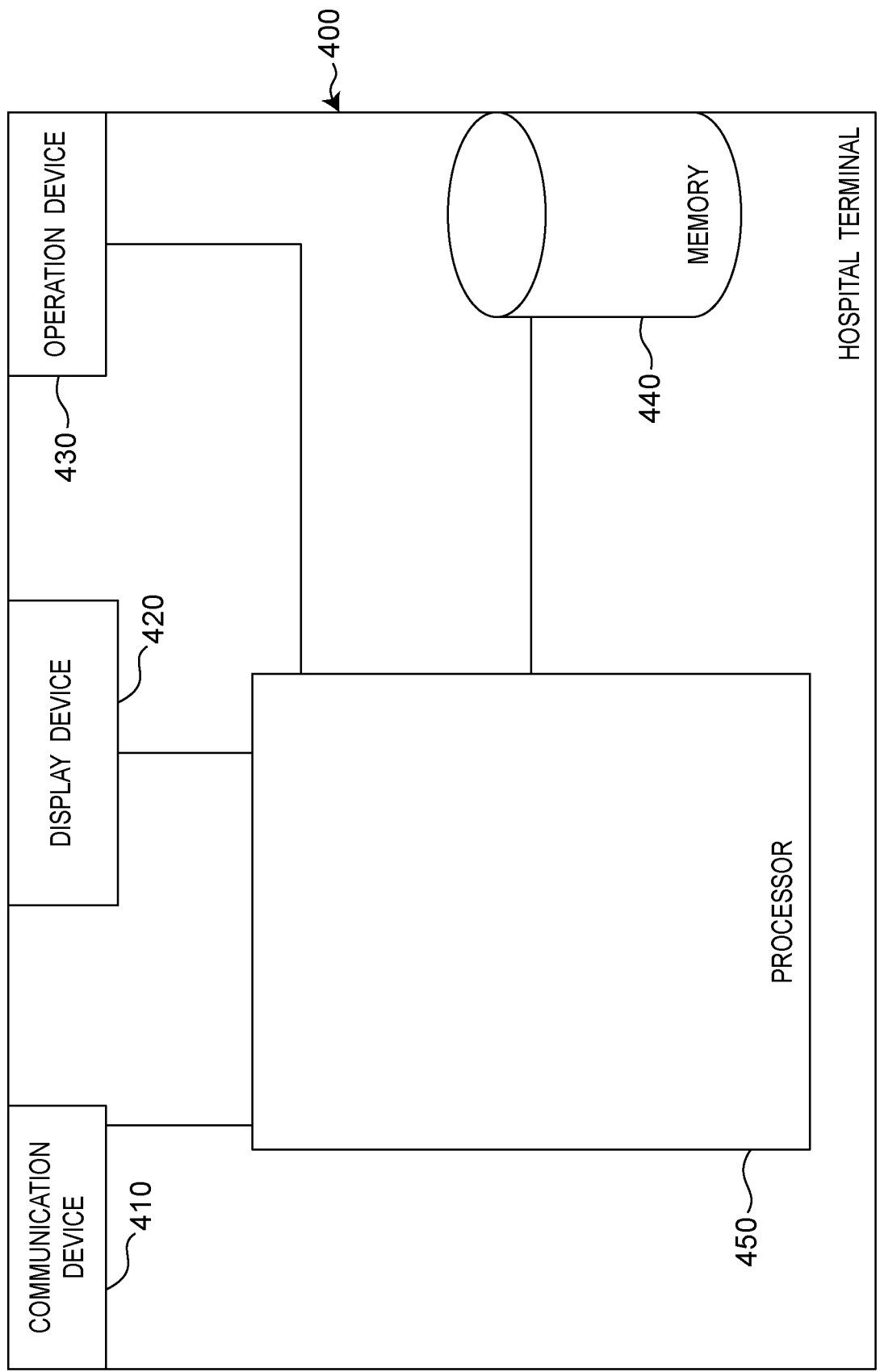
FIG. 6 is a diagram illustrating a schematic configuration of a hospital terminal included in the blood pressure value analysis support system.

FIG. 6 illustrates a schematic configuration of the hospital terminal 400. Note that, as described above, a plurality of the hospital terminals 400 may be disposed in the system configuration illustrated in FIG. 1. Here, the hospital terminal 400 may be a personal computer or a portable terminal such as a tablet. The hospital terminal 400 can access the blood pressure value analysis support apparatus 300 via the communication network 50. As illustrated in FIG. 6, the hospital terminal 400 includes a communication device 410, a display device 420, an operation device 430, a memory 440, and a processor 450.

In FIG. 6, the communication device 410 transmits and receives various types of data. In the example of FIG. 1, the communication device 410 is connected to the communication network 50. The communication device 410 receives, for example, the time-series data of blood pressure and various output data transmitted from the blood pressure value analysis support apparatus 300. Here, as described above, the various output data are generated by the processor 350 of the blood pressure value analysis support apparatus 300.

The display device 420 has a display screen that displays various images. For example, the display device 420 displays an image based on the various output data received from the blood pressure value analysis support apparatus 300 in a visually recognizable manner. Furthermore, the display device 420 can also display predetermined information in a visually recognizable manner according to a desire from the user via the operation device 430. For example, the display device 420 may display information (data) stored in the memory 440 in a visually recognizable manner. For example, a liquid crystal monitor or the like can be adopted as the display device 420.

The operating device 430 receives a predetermined operation (instruction) from the user. For example, the operation device 430 includes a mouse, a keyboard, and the like. Here, in a case where a touch panel monitor is employed as the display device 420, the display device 420 has not only a display function but also a function as the operation device 430.

The memory 440 stores various types of data. For example, the memory 440 can store the time-series data of blood pressure received by the communication device 410, the various output data transmitted from the blood pressure value analysis support apparatus 300, and the like. The memory 440 can also store various types of data generated by the processor 450. The memory 440 includes a RAM, a ROM, and the like. For example, various programs are changeably stored in the memory 440.

The processor 450 includes a CPU in this example. For example, the processor 450 reads each program and each data stored in the memory 440. In addition, the processor 450 controls each of the units 410, 420, 430, and 440 according to the read program to execute a predetermined operation (function). In addition, the processor 450 performs predetermined calculation, analysis, processing, and the like in the processor 450 according to the read program. Note that some or all of the functions executed by the processor 450 may be configured as hardware by one or a plurality of integrated circuits or the like.

(Operation of Blood Pressure Value Analysis Support System 100)

The blood pressure value analysis support method is a method of supporting analysis of the time-series data of blood pressure obtained from the measurement result of the sphygmomanometer 200. Hereinafter, the blood pressure value analysis support method will be specifically described based on an operation of the blood pressure value analysis support system 100.

Figure 7:
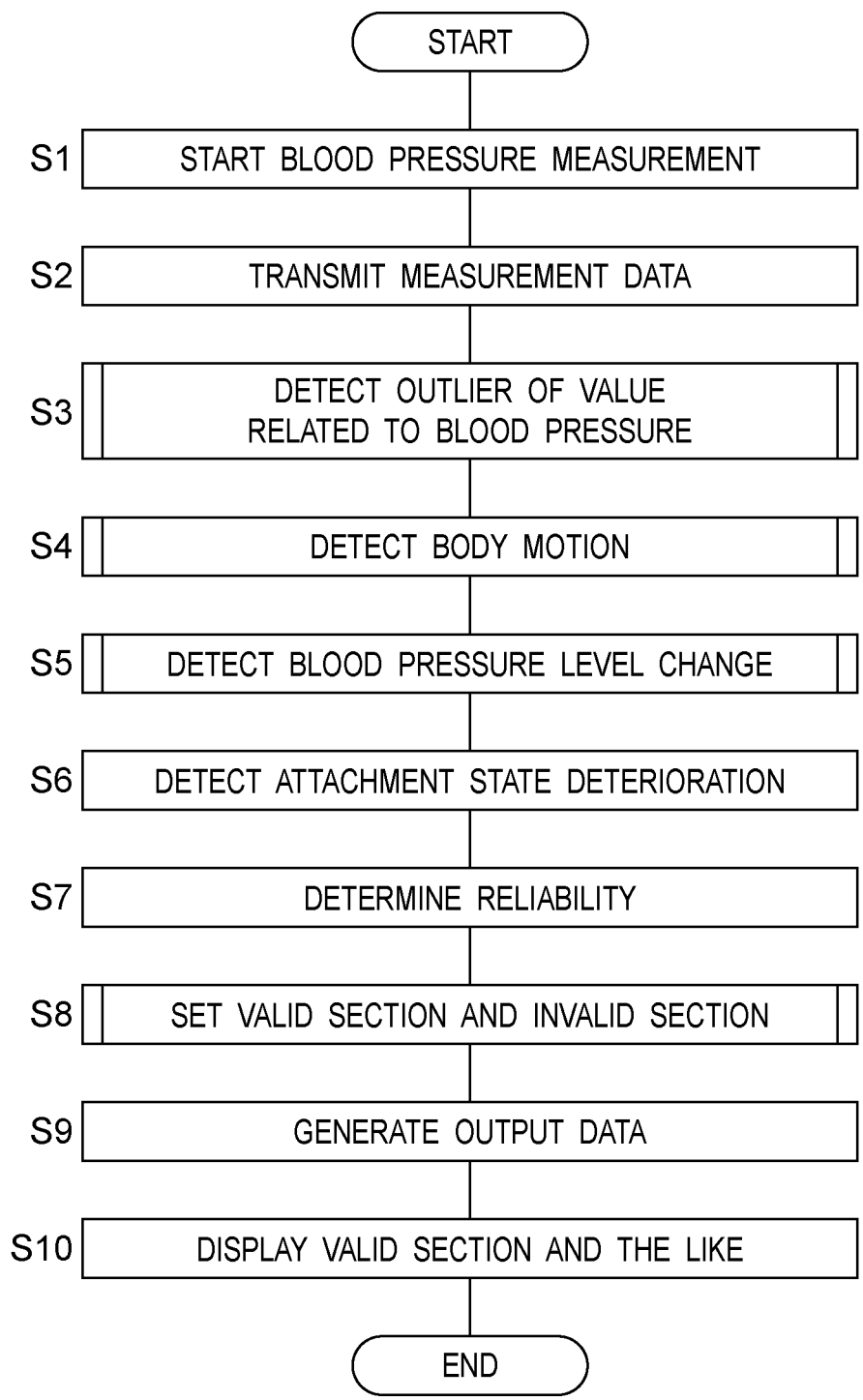
FIG. 7 is a flowchart for explaining an operation of the blood pressure value analysis support system according to the embodiment.

FIG. 7 illustrates a flow of operation (steps S1 to S10) of the blood pressure value analysis support system 100 according to the present embodiment.

(1) Start Blood Pressure Measurement (Step S1 in FIG. 7)

First, the sphygmomanometer 200 starts measurement (step S1). Step S1 is performed when the operation device 230 of the sphygmomanometer 200 receives an instruction to start measurement from the user. Note that the measurement in step S1 includes measurement of the blood pressure value for each beat by the blood pressure device 210 and detection measurement of movement of the sphygmomanometer 200 by the motion sensor 220. Note that the blood pressure data for each beat is associated with the measurement time, and similarly, each motion data is also associated with the measurement time.

As described above, for example, the sphygmomanometer 200 is attached to the wrist w of the subject in order to continuously measure the pressure pulse wave (blood pressure) of the radial artery TD for each beat (see FIGS. 2 and 3). Then, at the time of the blood pressure measurement, the pressing mechanism 212 of the blood pressure device 210 applies a predetermined pressing force to the wrist w. Then, while the pressing force is applied, the pressure sensor 211 of the blood pressure device 210 detects the blood pressure of the radial artery TD for each beat. Note that the detection result of the motion sensor 220 is stored in time series in the memory 250 of the sphygmomanometer 200, for example. Similarly, the measurement results of the pressure sensor 211 are stored in time series in the memory 250.

(2) Transmit Measurement Data (Step S2 in FIG. 7)

Next, the communication device 240 of the sphygmomanometer 200 transmits the measurement data to the blood pressure value analysis support apparatus 300 in this example (step S2). Here, the measurement data includes the detection result of the motion sensor 220 and the measurement result of the pressure sensor 211. The communication device 310 of the blood pressure value analysis support apparatus 300 receives measurement data transmitted in step S2. Then, the memory 340 of the blood pressure value analysis support apparatus 300 stores the measurement data received by the communication device 310. The sphygmomanometer 200 may once transmit the measurement data to any one of the hospital terminals 400, and the hospital terminal 400 may transmit the measurement data to the blood pressure analysis support apparatus 300.

The processor 350 of the blood pressure value analysis support apparatus 300 illustrated in FIG. 5 performs the processing of steps S3 to S6 in order to determine the reliability of the blood pressure for each beat. More specifically, the processor 350 (one-beat reliability determination unit 351) determines reliability of the blood pressure value for each beat based on information indicating disturbance (steps S3 to S6) for the time-series data of blood pressure including the blood pressure value for each beat (step S7). Here, the reliability of the blood pressure value for each beat includes at least a first reliability (for example, reliability: high) indicating that the blood pressure value should be used for analysis and a second reliability (for example, reliability: low, middle) indicating that the reliability is lower than the first reliability.

The information indicating disturbance includes, for example, an outlier of a value related to the blood pressure (see step S3), body motion (see step S4), variation of the blood pressure value level (in other words, variation of the attachment state of the sphygmomanometer 200) (see step S5), and attachment state deterioration (in other words, a state in which the attachment state of the sphygmomanometer 200 changes with respect to the measurement target site of the subject, and the measurement result of the sphygmomanometer 200 is adversely affected) (step S6). Hereinafter, first, an operation of the processor 350 of the blood pressure value analysis support apparatus 300 will be described with respect to steps S3 to S6.

(3) Outlier Detection (Step S3 in FIG. 7)

Figure 8:
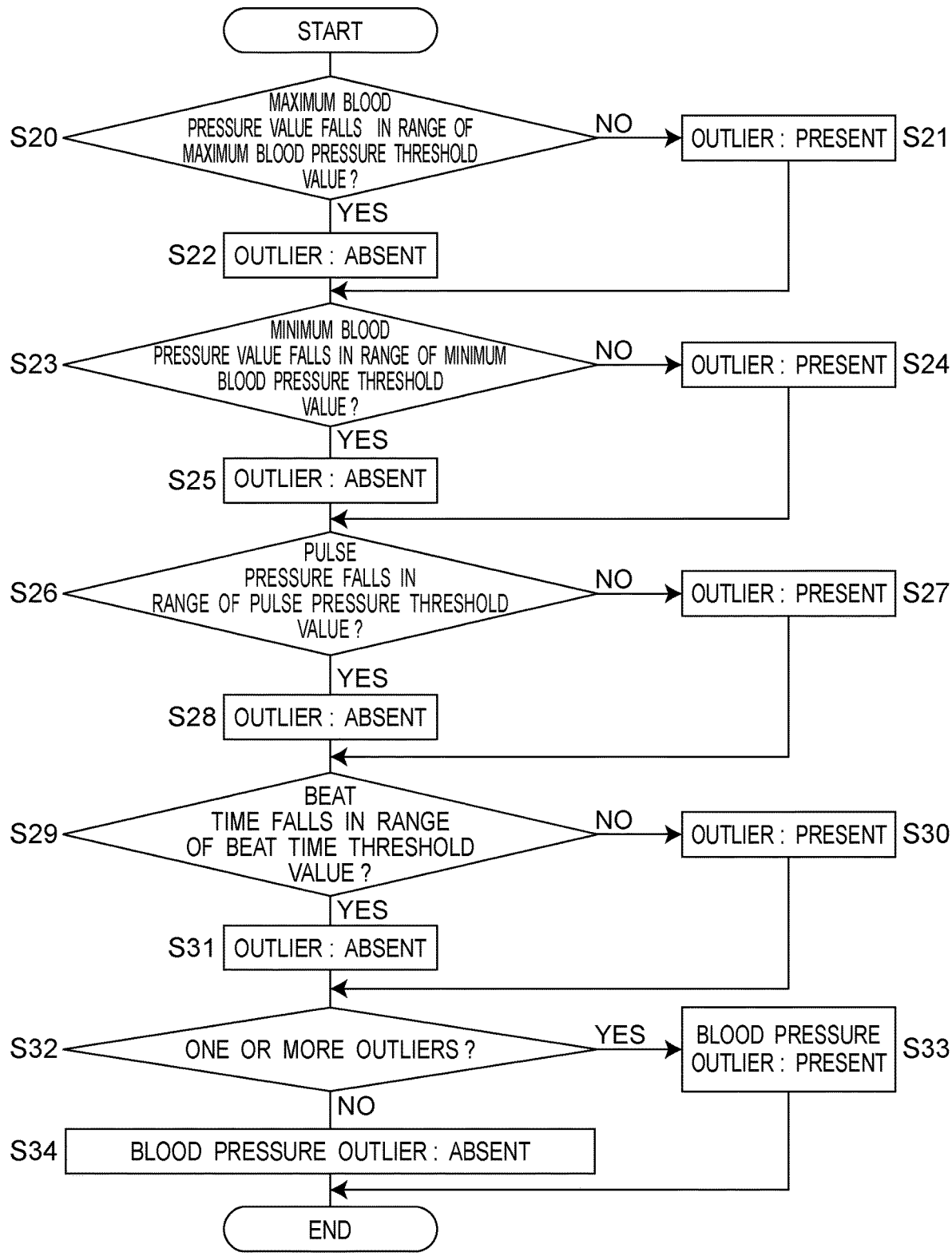
FIG. 8 is a flowchart for explaining an operation of determining presence or absence of an outlier of blood pressure.

The processor 350 (one-beat reliability determination unit 351) detects whether or not there is an outlier with respect to the value related to the blood pressure (step S3). FIG. 8 illustrates details of specific operation of step S3. As described above, the memory 340 stores the blood pressure value for each beat in time-series (in other words, stores the time-series data of blood pressure). The one-beat reliability determination unit 351 reads the time-series data of blood pressure from the memory 340.

In step S20 of FIG. 8, the one-beat reliability determination unit 351 compares a maximum blood pressure value SBP (alternatively, systolic blood pressure) with maximum blood pressure value threshold values SBPth1 and SBPth2 for each of the blood pressures of one beat. Here, the maximum blood pressure value threshold values SBPth1 and SBPth2 include a maximum blood pressure value upper limit threshold value SBPth1 and a maximum blood pressure value lower limit threshold value SBPth2, and the maximum blood pressure value threshold values SBPth1 and SBPth2 are stored in advance in the memory 340 of the blood pressure value analysis support apparatus 300. Therefore, the one-beat reliability determination unit 351 reads the maximum blood pressure value threshold values SBPth1 and SBPth2 from the memory 340.

The maximum blood pressure value threshold values SBPth1 and SBPth2 can be determined based on a distribution of blood pressure information. For example, the distribution is generated using the blood pressure information obtained at rest of the subject. As an example, the maximum blood pressure value threshold values SBPth1 and SBPth2 are statistically calculated from the distribution. Regarding the setting of the threshold values, a method disclosed in JP 2018-149182 A may be adopted. According to the method of JP 2018-149182 A, as an example, the maximum blood pressure value threshold values SBPth1 and SBPth2 can be determined such that the maximum blood pressure value upper limit threshold value SBPth1 substantially coincides with a third quartile+1.5×IQR (Inter-Quadile Range) and the maximum blood pressure value lower limit threshold value SBPth2 substantially coincides with a first quartile−1.5×IQR. The maximum blood pressure value threshold values SBPth1 and SBPth2 can also be set using (average+2×standard deviation) as statistical values.

The maximum blood pressure value threshold values SBPth1 and SBPth2 may be changeable values or fixed values. The maximum blood pressure value threshold values SBPth1 and SBPth2 may be automatically calculated based on the statistical distribution or the like. Then, the calculated values may be automatically set. The matters related to the setting of the "threshold values" similarly apply to each "threshold value" which will be described below.

Figure 9:
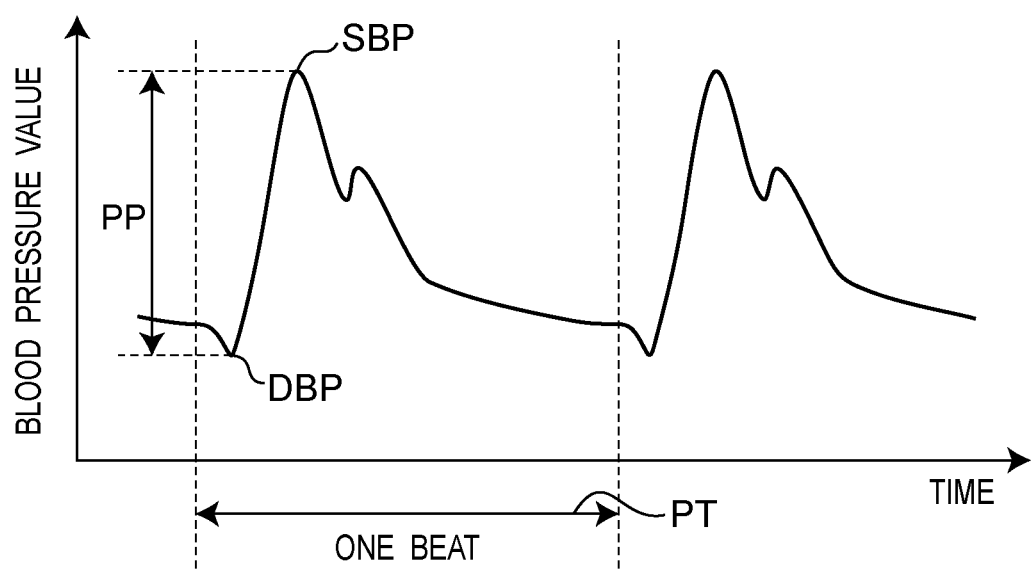
FIG. 9 is a diagram illustrating a waveform of blood pressure for each beat.
Figure 10:
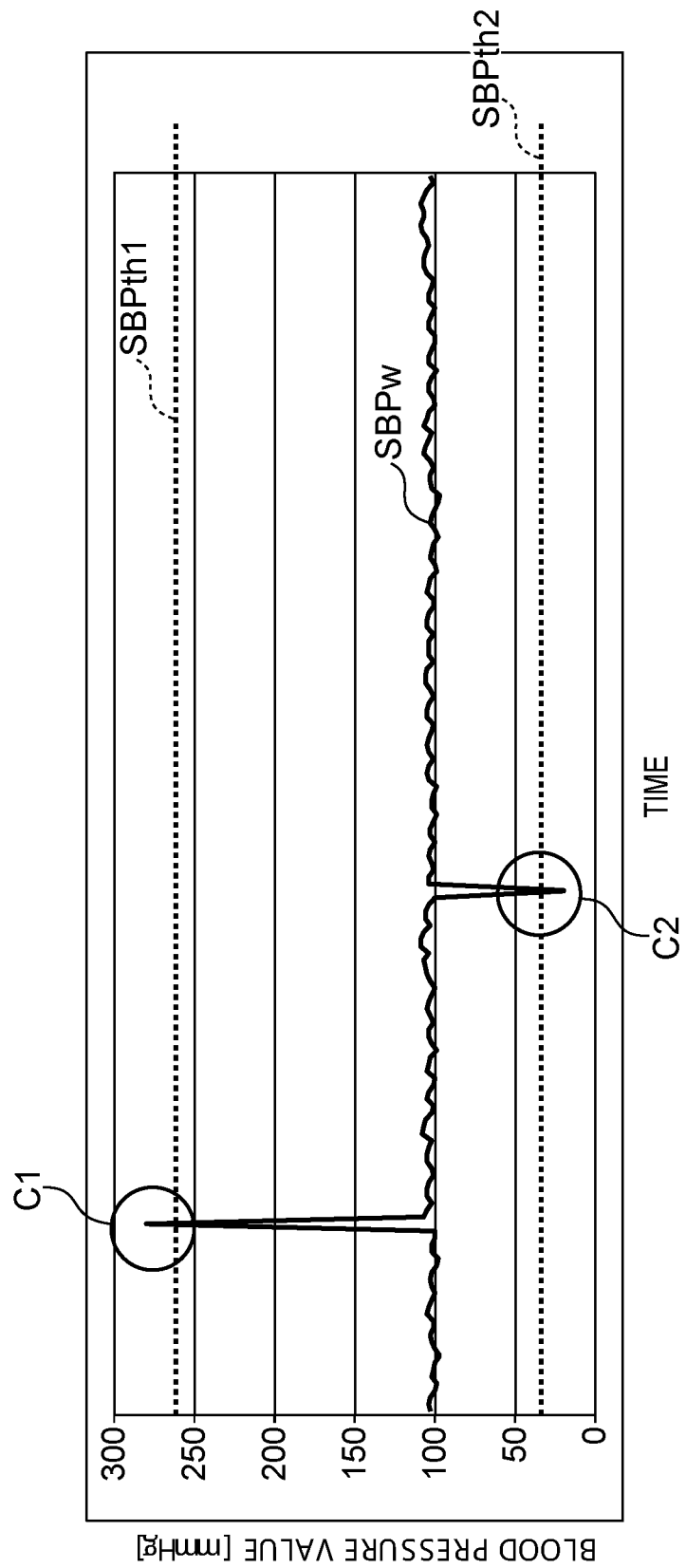
FIG. 10 is a diagram for explaining an operation of determining presence or absence of an outlier of a maximum blood pressure value.

FIG. 9 illustrates a measurement result of the blood pressure for each beat. In FIG. 9, a vertical axis represents the blood pressure value, and a horizontal axis represents time. FIG. 9 illustrates measurement results of blood pressure for two beats. The highest value in the blood pressure of one beat illustrated in FIG. 9 is the maximum blood pressure value SBP. In addition, it is assumed that the one-beat reliability determination unit 351 acquires the maximum blood pressure value SBP with respect to each of the blood pressures of a plurality of beats read from the memory 340 and arranges the values in time series. In this case, as illustrated in FIG. 10, time-series data SBPw of the maximum blood pressure, which is an example of the time-series data of blood pressure, is generated. Here, a vertical axis in FIG. 10 represents the blood pressure value (mmHg), and a horizontal axis in FIG. 10 represents time. FIG. 10 also illustrates the maximum blood pressure value upper limit threshold value SBPth1 and the maximum blood pressure value lower limit threshold value SBPth2.

Specifically, in step S20 of FIG. 8, the one-beat reliability determination unit 351 determines whether or not the maximum blood pressure value SBP is within a range between the maximum blood pressure value upper limit threshold value SBPth1 and the maximum blood pressure value lower limit threshold value SBPth2 with respect to the blood pressure for each beat. Here, in the blood pressure of one beat, it is assumed that the maximum blood pressure value SBP exceeds the maximum blood pressure value upper limit threshold value SBPth1 (see C1 in FIG. 10) or is less than the maximum blood pressure value lower limit threshold value SBPth2 (see C2 in FIG. 10) (NO in step S20). In this case, the one-beat reliability determination unit 351 determines that there is an outlier with respect to the blood pressure of one beat (step S21). Then, the one-beat reliability determination unit 351 records, in the memory 340, that the maximum blood pressure value SBP is an outlier with respect to the blood pressure of one beat (step S21).

On the other hand, it is assumed that the maximum blood pressure value SBP is equal to or less than the maximum blood pressure value upper limit threshold value SBPth1 and equal to or more than the maximum blood pressure value lower limit threshold value SBPth2 in the blood pressure of one beat (YES in step S20). In this case, the one-beat reliability determination unit 351 determines that there is no outlier with respect to the blood pressure of one beat (step S22). Then, the one-beat reliability determination unit 351 records, in the memory 340, that the maximum blood pressure value SBP is not an outlier with respect to the blood pressure of one beat (step S22).

Next, in step S23 of FIG. 8, the one-beat reliability determination unit 351 compares a minimum blood pressure value DBP (alternatively, diastolic blood pressure) with minimum blood pressure value threshold values DBPth1 and DBPth2 for each of the blood pressures of one beat. Here, the minimum blood pressure value threshold values DBPth1 and DBPth2 include a minimum blood pressure value upper limit threshold value DBPth1 and a minimum blood pressure value lower limit threshold value DBPth2, and the minimum blood pressure value threshold values DBPth1 and DBPth2 are stored in advance in the memory 340 of the blood pressure value analysis support apparatus 300. Therefore, the one-beat reliability determination unit 351 reads the minimum blood pressure value threshold values DBPth1 and DBPth2 from the memory 340. In order to set the minimum blood pressure value threshold values DBPth1 and DBPth2, for example, the same method as the method of determining (setting) the maximum blood pressure value threshold values SBPth1 and SBPth2 described above can be used.

Figure 11:
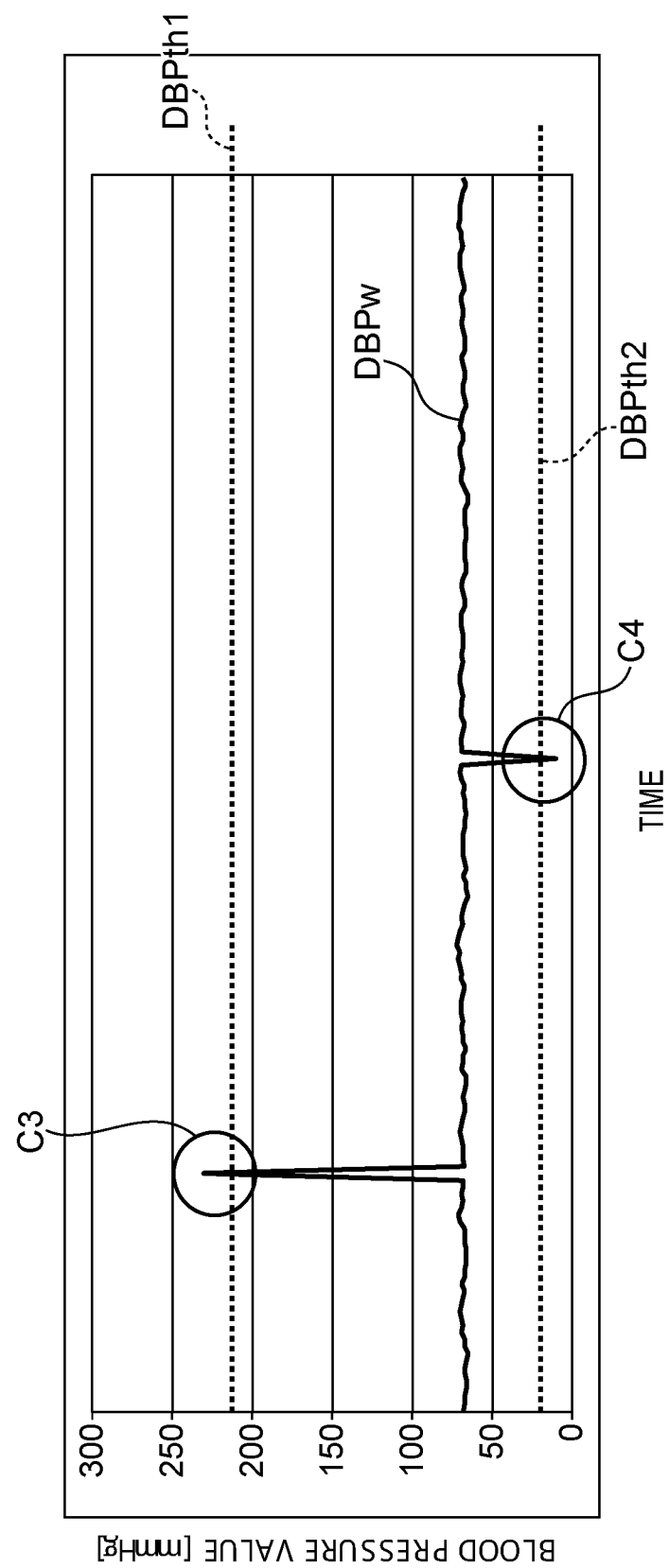
FIG. 11 is a diagram for explaining an operation of determining presence or absence of an outlier of a minimum blood pressure value.

In addition, the lowest value in the blood pressure of one beat illustrated in FIG. 9 is the minimum blood pressure value DBP. In addition, it is assumed that the one-beat reliability determination unit 351 acquires the minimum blood pressure value DBP with respect to each of the blood pressures of a plurality of beats read from the memory 340 and arranges the blood pressures in time series. In this case, as illustrated in FIG. 11, time-series data DBPw of the minimum blood pressure value, which is an example of the time-series data of blood pressure, is generated. Here, a vertical axis in FIG. 11 represents the blood pressure value (mmHg), and a horizontal axis in FIG. 11 represents time. FIG. 11 also illustrates the minimum blood pressure value upper limit threshold value DBPth1 and the minimum blood pressure value lower limit threshold value DBPth2.

Specifically, in step S23 of FIG. 8, the one-beat reliability determination unit 351 determines whether or not the minimum blood pressure value DBP is within a range between the minimum blood pressure value upper limit threshold value DBPth1 and the minimum blood pressure value lower limit threshold value DBPth2 with respect to the blood pressure for each beat. Here, it is assumed that, in the blood pressure of one beat, the minimum blood pressure value DBP exceeds the minimum blood pressure value upper limit threshold value DBPth1 (see C3 in FIG. 11) or is less than the minimum blood pressure value lower limit threshold value DBPth2 (see C4 in FIG. 11) (NO in step S23). In this case, the one-beat reliability determination unit 351 determines that there is an outlier with respect to the blood pressure of one beat (step S24). Then, the one-beat reliability determination unit 351 records, in the memory 340, that the minimum blood pressure value DBP is an outlier with respect to the blood pressure of one beat (step S24).

On the other hand, it is assumed that, in the blood pressure of one beat, the minimum blood pressure value DBP is equal to or less than the minimum blood pressure value upper limit threshold value DBPth1 and equal to or more than the minimum blood pressure value lower limit threshold value DBPth2 (YES in step S23). In this case, the one-beat reliability determination unit 351 determines that there is no outlier with respect to the blood pressure of one beat (step S25). Then, the one-beat reliability determination unit 351 records that the minimum blood pressure value DBP is not an outlier with respect to the blood pressure of one beat in the memory 340 (step S25).

Next, in step S26 of FIG. 8, the one-beat reliability determination unit 351 compares a pulse pressure PP with pulse pressure threshold values PPth1 and PPth for each of the blood pressures of one beat. Here, the pulse pressure threshold values PPth1 and PPth include a pulse pressure upper limit threshold value PPth1 and a pulse pressure lower limit threshold value PPth2, and the pulse pressure threshold values PPth1 and PPth2 are stored in advance in the memory 340 of the blood pressure value analysis support apparatus 300. Therefore, the one-beat reliability determination unit 351 reads the pulse pressure threshold values PPth1 and PPth2 from the memory 340. In order to set the pulse pressure threshold values PPth1 and PPth2, for example, the same method as the method of determining (setting) the maximum blood pressure value threshold values SBPth1 and SBPth2 described above can be used.

In the blood pressure for each beat illustrated in FIG. 9, a difference between the maximum blood pressure value SBP and the minimum blood pressure value DBP is the pulse pressure PP. In addition, it is assumed that the one-beat reliability determination unit 351 acquires the pulse pressure PP with respect to each of the blood pressures of a plurality of beats read from the memory 340 and arranges the pulse pressures PP in time series. In this case, a pulse pressure waveform (not illustrated), which is an example of the time-series data of blood pressure, is generated.

Specifically, in step S26 of FIG. 8, the one-beat reliability determination unit 351 determines whether or not the pulse pressure PP is within a range between the pulse pressure upper limit threshold value PPth1 and the pulse pressure lower limit threshold value PPth2 with respect to the blood pressure for each beat. In the blood pressure of one beat, it is assumed that the pulse pressure PP exceeds the pulse pressure upper limit threshold value PPth1 or is less than the pulse pressure lower limit threshold value PPth2 (NO in step S26). In this case, the one-beat reliability determination unit 351 determines that there is an outlier with respect to the blood pressure of one beat (step S27). Then, the one-beat reliability determination unit 351 records, in the memory 340, that the pulse pressure PP is an outlier with respect to the blood pressure of one beat (step S27).

On the other hand, it is assumed that the pulse pressure PP is equal to or lower than the pulse pressure upper limit threshold value PPth1 and equal to or higher than the pulse pressure lower limit threshold value PPth2, in the blood pressure of one beat (YES in step S26). In this case, the one-beat reliability determination unit 351 determines that there is no outlier with respect to the blood pressure of one beat (step S28). Then, the one-beat reliability determination unit 351 records, in the memory 340, that the pulse pressure PP is not an outlier with respect to the blood pressure of one beat (step S28).

Next, in step S29 of FIG. 8, the one-beat reliability determination unit 351 compares the beat time PT with beat time threshold values PTth1 and PTth2 for each of the blood pressures of one beat. Here, the beat time threshold values PTth1 and PTth2 include a beat time upper limit threshold value PTth1 and a beat time lower limit threshold value PTth2, and the beat time threshold values PTth1 and PTth2 are stored in advance in the memory 340 of the blood pressure value analysis support apparatus 300. Therefore, the one-beat reliability determination unit 351 reads the beat time threshold values PTth1 and PTth2 from the memory 340. In order to set the beat time threshold values PTth1 and PTth2, for example, the same method as the method of determining (setting) the maximum blood pressure value threshold values SBPth1 and SBPth2 described above can be used.

In addition, in the blood pressure of each beat illustrated in FIG. 9, one cycle of the blood pressure of one beat (time of one beat) is the beat time PT. In addition, it is assumed that the one-beat reliability determination unit 351 acquires the beat time PT with respect to each of the blood pressures of a plurality of beats read from the memory 340 and arranges the beat times PT in time series. In this case, a beat time waveform (not illustrated), which is an example of the time-series data of blood pressure, is generated.

Specifically, in step S29 of FIG. 8, the one-beat reliability determination unit 351 determines whether or not the beat time PT is within a range between the beat time upper limit threshold value PTth1 and the beat time lower limit threshold value PTth2 with respect to the blood pressure for each beat. In the blood pressure of one beat, it is assumed that the beat time PT exceeds the beat time upper limit threshold value PTth1 or is less than the beat time lower limit threshold value PTth2 (NO in step S29). In this case, the one-beat reliability determination unit 351 determines that there is an outlier with respect to the blood pressure of one beat (step S30). Then, the one-beat reliability determination unit 351 records, in the memory 340, that the beat time PT is an outlier with respect to the blood pressure of one beat (step S30).

On the other hand, it is assumed that the beat time PT is equal to or less than the beat time upper limit threshold value PTth1 and equal to or more than the beat time lower limit threshold value PTth2 in the blood pressure of one beat (YES in step S29). In this case, the one-beat reliability determination unit 351 determines that there is no outlier with respect to the blood pressure of one beat (step S31). Then, the one-beat reliability determination unit 351 records that the beat time PT is not an outlier with respect to the blood pressure of one beat in the memory 340 (step S31).

Next, in step S32 of FIG. 8, the one-beat reliability determination unit 351 determines whether or not the presence of at least one outlier for each of the blood pressures of one beat has been determined. That is, the one-beat reliability determination unit 351 determines whether or not the processing of step S21, step S24, step S27, or step S30 has been performed (step S32).

Here, it is assumed that the one-beat reliability determination unit 351 has determined that the presence of at least one outlier for the blood pressure of one beat has been determined in steps S21, 24, 27, and 30 (YES in step S32). In this case, the one-beat reliability determination unit 351 determines that there is a "blood pressure outlier" with respect to the blood pressure of one beat (step S33). That is, it determines that there is an outlier in any of the values (maximum blood pressure value, minimum blood pressure value, pulse pressure, and beat time) with respect to the blood pressure obtained from the blood pressure of one beat. Then, the one-beat reliability determination unit 351 records, in the memory 340, that there is a "blood pressure outlier" with respect to the blood pressure of one beat (step S33).

On the other hand, it is assumed that the one-beat reliability determination unit 351 has determined that, with respect to the blood pressure of one beat, all the processing of steps S22, S25, S28, and S31 has been performed, without the processing of step S21, 24, 27, or 30 (NO in step S32). In this case, the one-beat reliability determination unit 351 determines that there is no "blood pressure outlier" with respect to the blood pressure of one beat (step S34). That is, it determines that there is no outlier in any of the values (maximum blood pressure value, minimum blood pressure value, pulse pressure, and beat time) with respect to the blood pressure obtained from the blood pressures of one beat. Then, the one-beat reliability determination unit 351 records, in the memory 340, that there is no "blood pressure outlier" with respect to the blood pressure of one beat (step S34).

The one-beat reliability determination unit 351 performs the flow illustrated in FIG. 8 (step S3 in FIG. 7) on the blood pressure of each one beat measured by the sphygmomanometer 200. Note that, before the processing of step S20 in FIG. 8, the one-beat reliability determination unit 351 may record, in the memory 340, that there is no outlier, as a default, with respect to the maximum blood pressure value, the minimum blood pressure value, the pulse pressure, the beat time, and the "blood pressure outlier". In this case, when the presence of an outlier has been determined in each of steps S20, 23, 26, 29, and 32, the one-beat reliability determination unit 351 performs the processing of steps S21, 24, 27, 30, and 33. On the other hand, when the absence of an outlier has been determined in each of steps S20, 23, 26, 29, and 32, the one-beat reliability determination unit 351 omits the processing of steps S22, 25, 28, and 31. That is, the one-beat reliability determination unit 351 only needs to change registration of the absence of an outlier to registration of the presence of an outlier only in the item for which the presence of an outlier has been determined.

(4) Body Motion Detection (Step S4 in FIG. 7)

After step S3 in FIG. 7, step S4 is performed.

Figure 12:
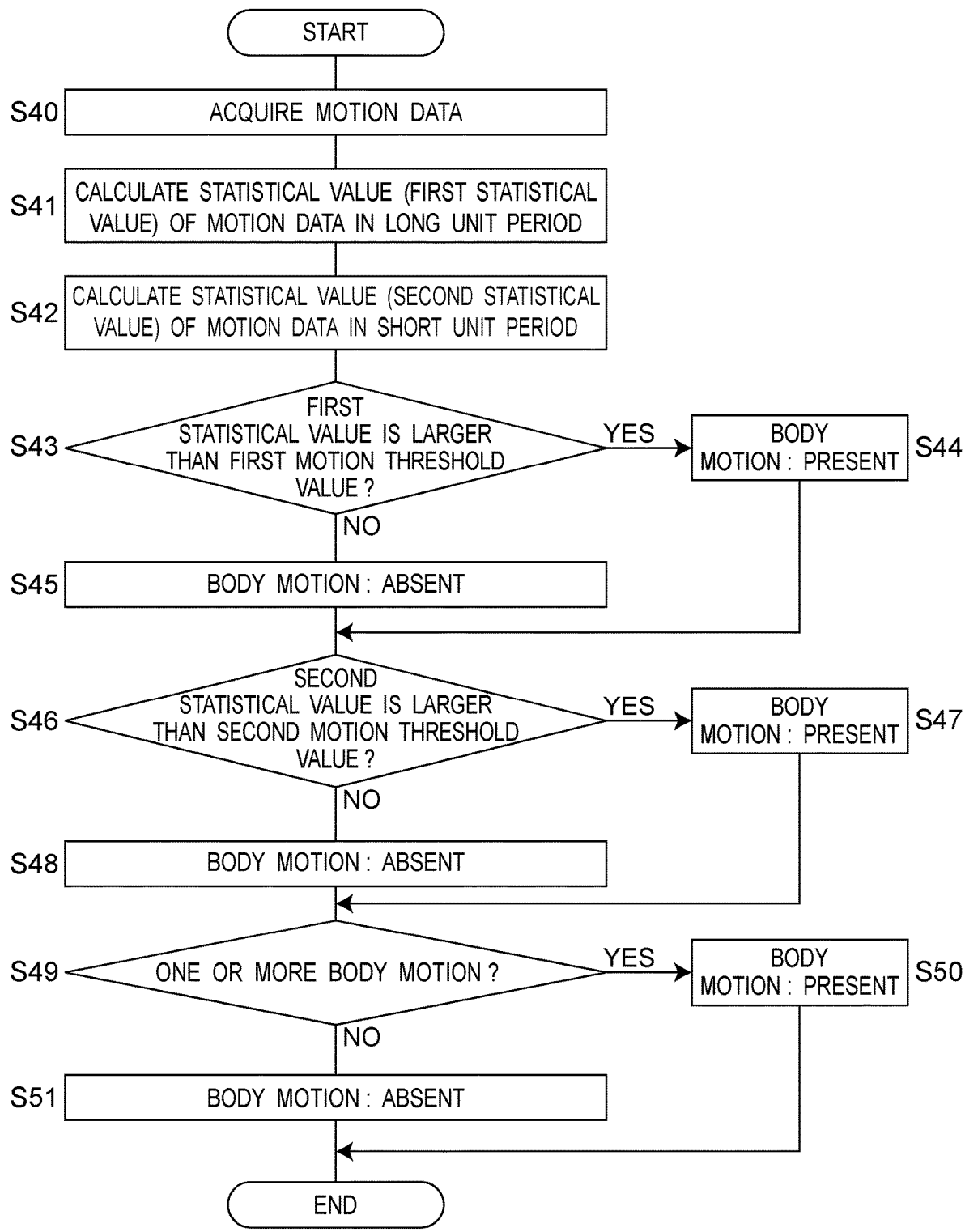
FIG. 12 is a flowchart for explaining an operation of determining presence or absence of body motion.

The processor 350 (one-beat reliability determination unit 351) detects whether or not the subject moves (in other words, whether the sphygmomanometer 200 moves) during the measurement with the sphygmomanometer 200 (body motion detection) (step S4). More specifically, the one-beat reliability determination unit 251 performs body motion detection based on a statistical value of motion data indicating the motion of the subject during measurement with the sphygmomanometer 200 and a preset motion threshold value. As will be described later, the statistical value of the motion data includes a first statistical value and a second statistical value. As will be described later, the motion threshold value includes a first motion threshold value (referred to as αth1) and a second motion threshold value (referred to as αth2). FIG. 12 illustrates details of specific operation of step S4.

As described above, the blood pressure value analysis support apparatus 300 receives measurement data transmitted in step S2, and the memory 340 in the blood pressure value analysis support apparatus 300 stores the measurement data. Here, the measurement data includes data (motion data) measured by the motion sensor 220 of the sphygmomanometer 200. The one-beat reliability determination unit 351 reads the motion data from the memory 340 (step S40). For example, the motion data may include, but is not limited to, acceleration or angular velocity values for one or more axes. As an example, the motion sensor 220 may be a three-axis acceleration sensor. As described above, the blood pressure data for each beat is associated with the measurement time, and similarly, each motion data is also associated with the measurement time.

In step S41 of FIG. 12, the one-beat reliability determination unit 351 calculates a statistical value (first statistical value) of the motion data in a long unit period (first unit period) LUP for each of the blood pressures of one beat. The "unit period" means a unit period that is a target for determination regarding the motion in the time-series data of blood pressure. The long unit period LUP may be, for example, about 60 seconds to 120 seconds, but is not limited thereto. Information on a length of the long unit period LUP is variably preset in the blood pressure value analysis support apparatus 300. Details regarding the statistical value of the motion data are disclosed in, for example, JP 2018-149182 A. In step S41, for example, an average value, a standard deviation, a root mean square, or a range of a triaxial composite value of the acceleration data in the long unit period LUP, or a slope of a single regression line based on the triaxial composite value of the acceleration data is calculated as the first statistical value.

Figure 13:
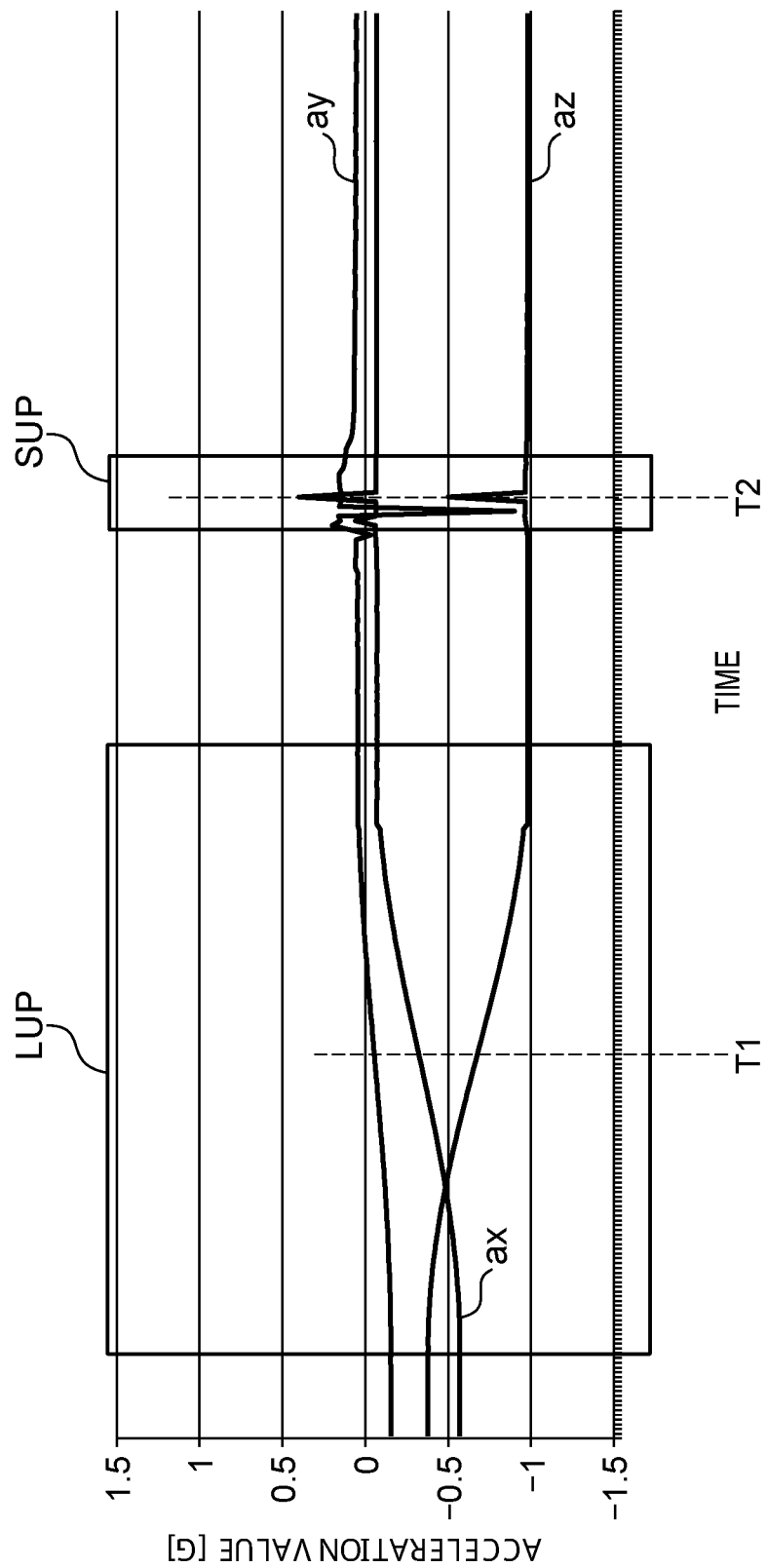
FIG. 13 is a diagram for explaining the operation of determining the presence or absence of the body motion.

FIG. 13 illustrates temporal changes in the motion data measured by the motion sensor 220. Here, a vertical axis in FIG. 13 represents an acceleration value (G: 1G=9.8 m/s$^2$), and a horizontal axis in FIG. 13 represents time. In the example of FIG. 13, the motion sensor 220 is a three-axis acceleration sensor. Therefore, in FIG. 13, an acceleration ax in the x direction, an acceleration ay in the y direction, and an acceleration az in the z direction are disclosed as the motion data.

For example, the one-beat reliability determination unit 351 focuses on a measurement time T1 of the blood pressure of one beat of current interest (see FIG. 13). Then, the one-beat reliability determination unit 351 sets the long unit period LUP (see FIG. 13) including the measurement time T1 and centered on the measurement time T1. Then, the one-beat reliability determination unit 351 calculates the statistical value (first statistical value) of the motion data using the motion data in the set long unit period LUP.

After step S41, the one-beat reliability determination unit 351 calculates a statistical value (second statistical value) of the motion data in a short unit period (second unit period) SUP for each of the blood pressures of one beat (step S42). Here, the short unit period SUP may be, for example, about 10 seconds, but is not limited thereto. Information on a length of the short unit period SUP is variably preset in the blood pressure value analysis support apparatus 300. As described above, the details regarding the statistical value of the motion data are disclosed in, for example, JP 2018-149182 A. In step S42, for example, an average value, a standard deviation, a root mean square, or a range of a triaxial composite value of the acceleration data in the short unit period SUP, or a slope of a single regression line based on the triaxial composite value of the acceleration data is calculated as the second statistical value.

For example, the one-beat reliability determination unit 351 focuses on a measurement time T2 of the blood pressure of one beat of current interest (see FIG. 13). Then, the one-beat reliability determination unit 351 sets the short unit period SUP (see FIG. 13) including the measurement time T2 and centered on the measurement time T2. Then, the one-beat reliability determination unit 351 calculates the statistical value (second statistical value) of the motion data using the motion data in the set short unit period SUP.

Next, in step S43 of FIG. 12, the one-beat reliability determination unit 351 compares the first statistical value (see step S41) with the preset first motion threshold value αth1 for each of the blood pressures of one beat. The first motion threshold value αth1 is stored in advance in the memory 340 of the blood pressure value analysis support apparatus 300. Therefore, the one-beat reliability determination unit 351 reads the first motion threshold value αth1 from the memory 340. In order to set the first motion threshold value αth1, for example, the same method as the method of determining (setting) the maximum blood pressure value threshold values SBPth1 and SBPth2 described above can be used.

Specifically, in step S43, the one-beat reliability determination unit 351 determines whether or not the first statistical value exceeds the first motion threshold value αth1 with respect to the blood pressure for each beat. In the blood pressure of one beat, it is assumed that the first statistical value exceeds the first motion threshold value αth1 (YES in step S43). In this case, the one-beat reliability determination unit 351 determines that there is body motion in the long unit period LUP with respect to the blood pressure of one beat (step S44). Then, the one-beat reliability determination unit 351 records, in the memory 340, that there is body motion in the long unit period LUP with respect to the blood pressure of one beat (step S44).

On the other hand, it is assumed that the first statistical value is equal to or less than the first motion threshold value αth1 in the blood pressure of one beat (NO in step S43). In this case, the one-beat reliability determination unit 351 determines that there is no body motion in the long unit period LUP with respect to the blood pressure of one beat (step S45). Then, the one-beat reliability determination unit 351 records, in the memory 340, that there is no body motion in the long unit period LUP with respect to the blood pressure of one beat (step S45).

Next, in step S46, the one-beat reliability determination unit 351 compares the second statistical value (see step S42) with the preset second motion threshold value αth2 for each of the blood pressures of one beat. The second motion threshold value αth2 is stored in advance in the memory 340 of the blood pressure value analysis support apparatus 300. Therefore, the one-beat reliability determination unit 351 reads the second motion threshold value αth2 from the memory 340. In order to set the second motion threshold value αth2, for example, the same method as the method of determining (setting) the maximum blood pressure value threshold values SBPth1 and SBPth2 described above can be used.

Specifically, in step S46, the one-beat reliability determination unit 351 determines whether or not the second statistical value exceeds the second motion threshold value αth2 with respect to the blood pressure for each beat. In the blood pressure of one beat, it is assumed that the second statistical value exceeds the second motion threshold value $\alpha\text{th}2$ (YES in step S46). In this case, the one-beat reliability determination unit 351 determines that there is body motion in the short unit period SUP with respect to the blood pressure of one beat (step S47). Then, the one-beat reliability determination unit 351 records, in the memory 340, that there is body motion in the short unit period SUP with respect to the blood pressure of one beat (step S47).

On the other hand, it is assumed that the second statistical value is equal to or less than the second motion threshold value $\alpha\text{th}2$ in the blood pressure of one beat (NO in step S46). In this case, the one-beat reliability determination unit 351 determines that there is no body motion in the short unit period SUP with respect to the blood pressure of one beat (step S48). Then, the one-beat reliability determination unit 351 records, in the memory 340, that there is no body motion in the short unit period SUP with respect to the blood pressure of one beat (step S48).

Next, the one-beat reliability determination unit 351 determines whether or not the presence of at least one body motion for each of the blood pressures of one beat has been determined (step S49). That is, the one-beat reliability determination unit 351 determines whether or not the processing of step S44 or the processing of step S47 has been performed (step S49).

Here, it is assumed that the one-beat reliability determination unit 351 determines that the presence of at least one body motion for the blood pressure of one beat has been determined insteps S44 and 47 (YES in step S49). In this case, the one-beat reliability determination unit 351 determines that there is body motion with respect to the blood pressure of one beat (step S50). Then, the one-beat reliability determination unit 351 records, in the memory 340, that there is body motion with respect to the blood pressure of one beat (step S50).

On the other hand, it is assumed that the one-beat reliability determination unit 351 determines that neither the processing of steps S44 and 47 is performed and all the processing of steps S45 and S48 is performed in the blood pressure of one beat (NO in step S49). In this case, the one-beat reliability determination unit 351 determines that there is no body motion with respect to the blood pressure of one beat (step S51). Then, the one-beat reliability determination unit 351 records that, in the memory 340, there is no body motion with respect to the blood pressure of one beat (step S51).

The one-beat reliability determination unit 351 performs the flow illustrated in FIG. 12 (step S4 in FIG. 7) on the blood pressure of each one beat measured by the sphygmomanometer 200. Note that, before the processing of step S43 of FIG. 12, the one-beat reliability determination unit 351 may record, in the memory 340, that there is no body motion, as a default, for the long unit period LUP and the short unit period SUP. In this case, when the presence of body motion has been determined in each of steps S43, 46, and 49, the one-beat reliability determination unit 351 performs the processing of steps S44, 47, and 50. On the other hand, when the absence of body motion has been determined in each of steps S43, 46, and 49, the one-beat reliability determination unit 351 omits the processing of steps S45, 48, and 51. That is, the one-beat reliability determination unit 351 only needs to change registration of the absence of body motion to registration of the presence of body motion only in the item for which the presence of body motion has been determined.

(5) Blood Pressure Level Change Detection (Step S5 in FIG. 7)

After step S4 in FIG. 7, step S5 is performed.

The processor 350 (one-beat reliability determination unit 351) detects a blood pressure level change in the time-series data of blood pressure (step S5). When the blood pressure measurement is continuously performed for a long time (for example, overnight) using the sphygmomanometer 200, body motion of the subject may occur during the measurement. Then, a height or the like of the sphygmomanometer 200 with respect to the heart of the subject changes with the body motion as a trigger, and a blood pressure level change in the time-series data of blood pressure (a phenomenon in which the blood pressure changes stepwise from one level to another level) occurs.

Figure 14:
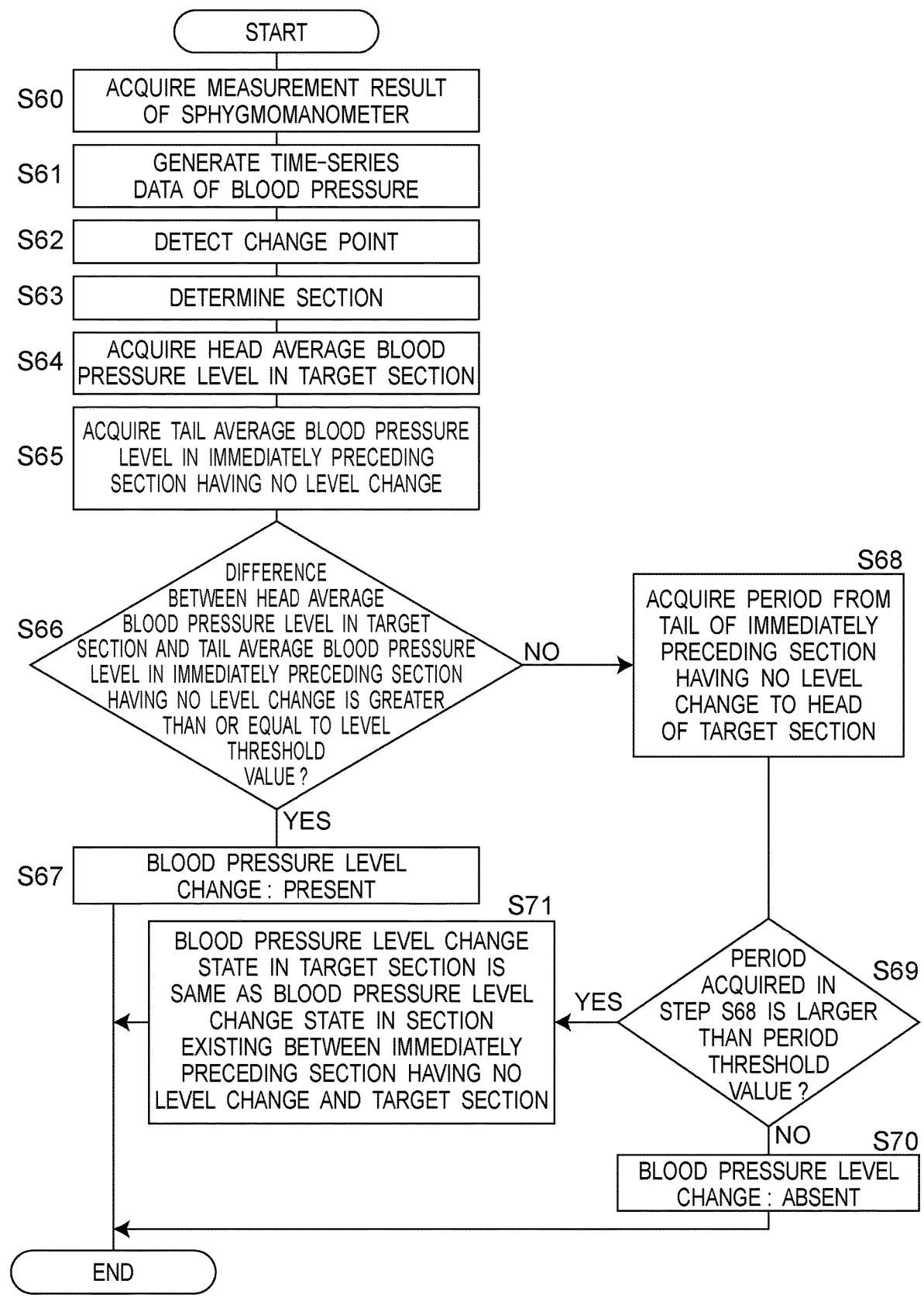
FIG. 14 is a flowchart for explaining an operation of determining presence or absence of a blood pressure level change.

The time-series data of blood pressure in step S5 includes time-series data of the maximum blood pressure value, time-series data of the minimum blood pressure value, and the like. As the time-series data of blood pressure, the time-series data of the minimum blood pressure value may be adopted. However, in the following description, as an example, the time-series data of blood pressure is the time-series data of the maximum blood pressure value. FIG. 14 illustrates details of specific operation of step S5.

As described above, the blood pressure value analysis support apparatus 300 receives the measurement data transmitted in step S2. Then, the memory 340 of the blood pressure value analysis support apparatus 300 stores the measurement data. Here, the measurement data includes data measured by the blood pressure device 210 of the sphygmomanometer 200 (blood pressure value for each beat). Here, the blood pressure value for each beat is associated with a measurement time for the blood pressure value of one beat. The one-beat reliability determination unit 351 reads the data from the memory 340 and acquires the maximum blood pressure value from each of the blood pressure values for each beat read from the memory 340 (step S60).

Figure 15:
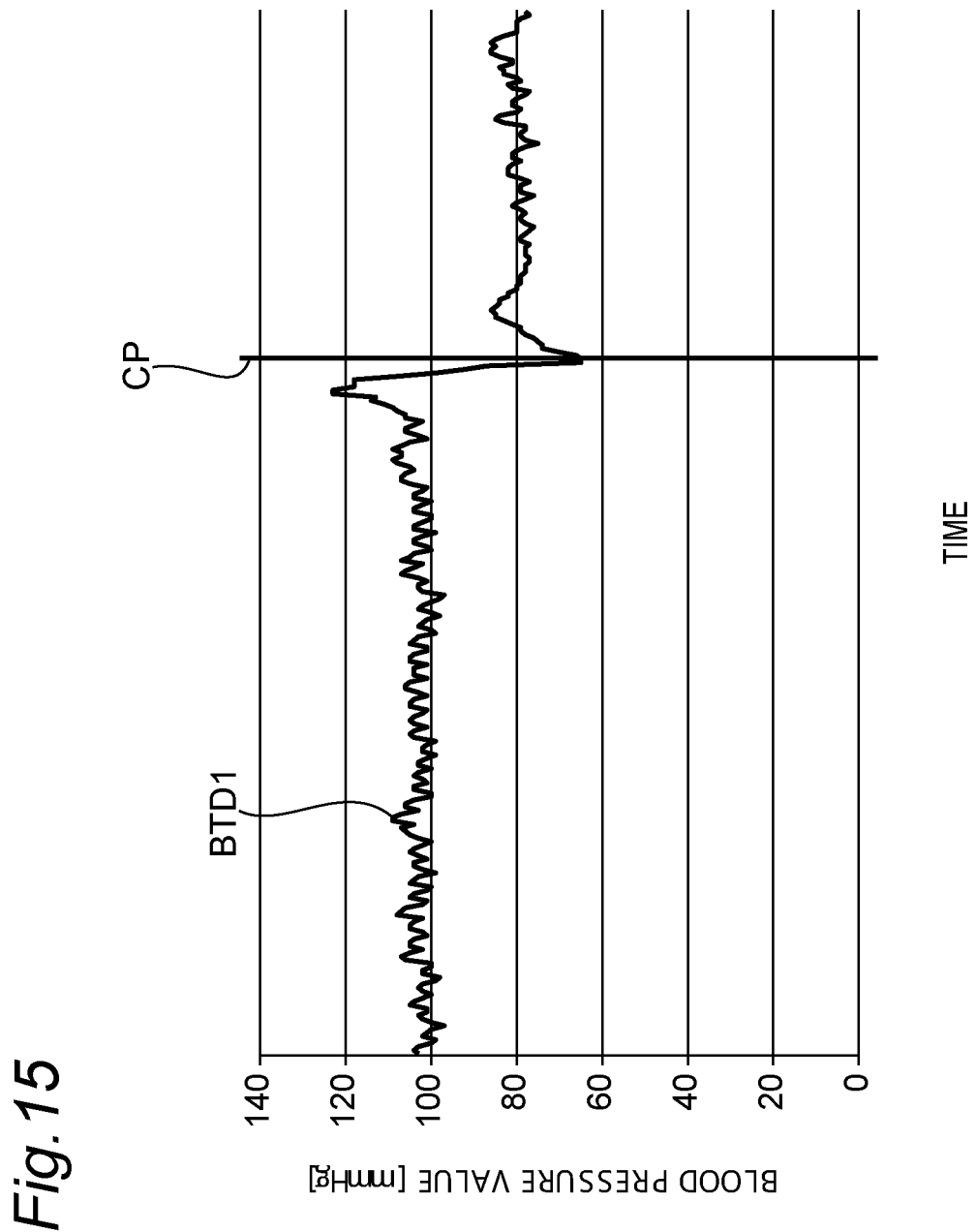
FIG. 15 is a diagram for explaining an operation of detecting a change point in time-series data of the maximum blood pressure value.

Next, the one-beat reliability determination unit 351 generates time-series data BTD1 of blood pressure (in the present embodiment, maximum blood pressure) using each of the maximum blood pressure values of one beat acquired in step S60 (step S61). FIG. 15 illustrates an example of the generated time-series data BTD1 of the maximum blood pressure. Here, a vertical axis in FIG. 15 represents the blood pressure value (mmHg), and a horizontal axis in FIG. 15 represents time.

Next, the one-beat reliability determination unit 351 detects a change point CP (see FIG. 15) in the time-series data BTD1 of the maximum blood pressure (step S62). Here, in the present embodiment, the change point represents a time when a tendency of the maximum blood pressure value changes steeply. Specifically, the change point represents a time at which the blood pressure value (in the present embodiment, maximum blood pressure value) for each beat changes beyond a predetermined change rate. For example, the change point is detected using a generally known change finder method, a method using a likelihood ratio test, a method using an auto-regressive (AR) model, or a method disclosed in JP 2018-147442 A.

Figure 16:
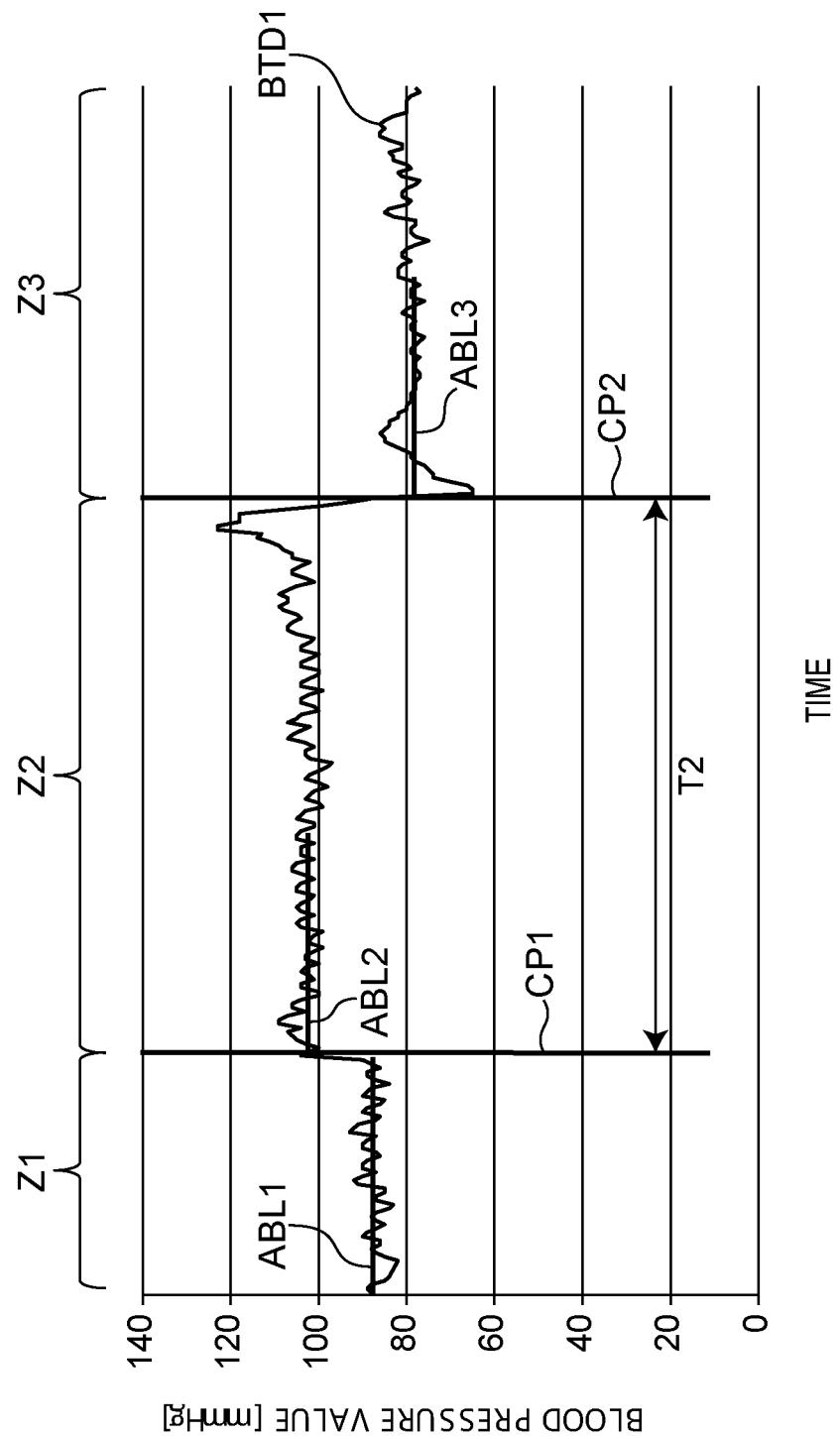
FIG. 16 is a diagram for explaining an operation of setting a section based on the change point in the time-series data of the maximum blood pressure value.

Next, the one-beat reliability determination unit 351 determines a plurality of consecutive sections in the time-series data BTD1 of the maximum blood pressure based on the change point, and divides the time-series data BTD1 of the maximum blood pressure into the sections (step S63). FIG. 16 illustrates an example in which at least two change points CP1 and CP2 are detected in the time-series data BTD1 of the maximum blood pressure. In the example of FIG. 16, the one-beat reliability determination unit 351 determines a section Z1, a section Z2, and a section Z3 with the change points CP1 and CP2 as boundaries (see FIG. 16). Then, the one-beat reliability determination unit 351 divides the time-series data BTD1 of the maximum blood pressure into the sections Z1, Z2, and Z3 (see FIG. 16). Therefore, the change point CP1 exists between the section Z1 and the section Z2 (boundary), and the change point CP2 exists between the section Z2 and the section Z3 (boundary).

Here, in the example of FIG. 16, it can be grasped that the section Z1 is a period from immediately after the start of the measurement with the sphygmomanometer 200 to the detection of the first change point CP1. Then, the section Z2 can be grasped as a period from immediately after the detection of the first change point CP1 to the detection of the second change point CP2. Then, the section Z3 can be grasped as a period from immediately after the detection of the second change point CP2 to a third change point (or to the end of the blood pressure measurement if no change point is detected thereafter). As described above, the section Z1 is a period from immediately after the start of the measurement to the detection of the first change point CP1. Therefore, the section Z1 is defined as a section without any blood pressure level change, and is used as a reference in the subsequent determination of the blood pressure level change.

After step S63, the one-beat reliability determination unit 351 performs each of steps S64 to S71 after step S64 on each of the sections Z2 and Z3 after the section Z2. Then, the one-beat reliability determination unit 351 determines presence or absence of a blood pressure level change of each of the sections Z2 and Z3 from the immediately preceding section having no level change (steps S67 and S70).

First, the one-beat reliability determination unit 351 acquires a head average blood pressure level in a target section (step S64). Here, the target section is a section in which presence or absence of the blood pressure level change is determined, and the target section here is the section Z2. In addition, the head average blood pressure level in the section Z2 is an average of the maximum blood pressure values over a period of a continuous predetermined length immediately after the change point CP1 for the time-series data BTD1 of the maximum blood pressure. Here, the predetermined period is variably set in advance in the blood pressure value analysis support apparatus 300. As an example, the predetermined length may be a length of 100 beats of blood pressure. Here, the one-beat reliability determination unit 351 averages the maximum blood pressure values over the period of the predetermined length which is continuous immediately after the change point CP1. In this example, the result of the average is expressed as a second average blood pressure level ABL2. Therefore, it is assumed that the one-beat reliability determination unit 351 has acquired the second average blood pressure level ABL2 as the head average blood pressure level in the target section Z2 (see FIG. 16).

Next, the one-beat reliability determination unit 351 acquires a tail average blood pressure level in the immediately preceding section having no level change (step S65). Here, the immediately preceding section having no level change is a section before the target section, in which it has been determined that there is no blood pressure level change. Here, the immediately preceding section having no level change is a section before the target section Z2, in which it can be grasped that there is no blood pressure level change. In the example of FIG. 16, the section before the target section Z2 is only the section Z1, and as described above, the section Z1 is a reference section having no blood pressure level change. Therefore, in the example of FIG. 16, when the target section is the section Z2, the immediately preceding section having no level change is the section Z1.

The tail average blood pressure level in the section Z1 is an average of the maximum blood pressure values over the period of the predetermined length (100 beats in this example) that is continuous immediately before the change point CP1 for the time-series data BTD1 of the maximum blood pressure. Here, the one-beat reliability determination unit 351 averages the maximum blood pressure values over the period of the predetermined length immediately before the change point CP1. The result of the average is expressed as a first average blood pressure level ABL1. Therefore, the one-beat reliability determination unit 351 acquires the first average blood pressure level ABL1 as the tail average blood pressure level in the immediately preceding section Z1 having no level change (see FIG. 16).

Next, the one-beat reliability determination unit 351 compares a difference between the head average blood pressure level in the target section and the tail average blood pressure level in the immediately preceding section having no level change with a level threshold value (this is referred to as ABLth) (step S66). Here, a value of 5 to 50 mmHg may be adopted as the level threshold value ABLth, but the level threshold value ABLth is not limited thereto. The level threshold value ABLth is stored in advance in the memory 340 of the blood pressure value analysis support apparatus 300, and the one-beat reliability determination unit 351 reads the level threshold value ABLth from the memory 340. Here, the head average blood pressure level in the target section Z2 is the second average blood pressure level ABL2, and the tail average blood pressure level in the immediately preceding section Z1 having no level change is the first average blood pressure level ABL1. Therefore, in step S66, the one-beat reliability determination unit 351 determines whether or not a difference between the second average blood pressure level ABL2 and the first average blood pressure level ABL1 is greater than or equal to the level threshold value ABLth.

Here, it is assumed that the one-beat reliability determination unit 351 has determined that the difference between the second average blood pressure level ABL2 and the first average blood pressure level ABL1 is greater than or equal to the level threshold value ABLth ("YES" in step S66). In this case, the one-beat reliability determination unit 351 determines that there is a blood pressure level change in the section Z2 (change point CP1) (step S67). Then, the one-beat reliability determination unit 351 records, in the memory 340, that there is a blood pressure level change with respect to the blood pressures of all the one beats belonging to the section Z2 (step S67).

On the other hand, it is assumed that the one-beat reliability determination unit 351 has determined that the difference between the second average blood pressure level ABL2 and the first average blood pressure level ABL1 is less than the level threshold value ABLth ("NO" in step S66). In this case, the one-beat reliability determination unit 351 proceeds to step S68.

Here, in the following description, it is assumed that the presence of a blood pressure level change in the section Z2 (change point CP1) has been determined. Therefore, the processing of steps S68 to S71 will be described later.

Next, operations of step S64 and the subsequent steps in FIG. 14 in a case where the target section is the section Z3 will be described.

First, the one-beat reliability determination unit 351 acquires a head average blood pressure level in a target section (step S64). The target section here is the section Z3. In addition, the head average blood pressure level in the section Z3 is an average of the maximum blood pressure values over the period of the predetermined length (100 beats in this example) which is continuous immediately after the change point CP2 for the time-series data BTD1 of the maximum blood pressure. Here, the one-beat reliability determination unit 351 averages the maximum blood pressure values over the period of the predetermined length which is continuous immediately after the change point CP2. The result of the average is a third average blood pressure level ABL3. Therefore, the one-beat reliability determination unit 351 acquires the third average blood pressure level ABL3 as the head average blood pressure level in the target section Z3 (see FIG. 16).

Next, the one-beat reliability determination unit 351 acquires a tail average blood pressure level in the immediately preceding section having no level change (step S65). Here, it is assumed that there is a blood pressure level change in the section Z2, and the section Z1 is the reference section as described above. Therefore, the immediately preceding section having no level change is the section Z1. Therefore, in step S65, it is assumed that the one-beat reliability determination unit 351 has acquired the first average blood pressure level ABL1 as the tail average blood pressure level in the immediately preceding section Z1 having no level change (see FIG. 16).

Next, in step S66, the one-beat reliability determination unit 351 compares a difference between the head average blood pressure level in the target section and the tail average blood pressure level in the immediately preceding section having no level change with the level threshold value ABLth. Here, the head average blood pressure level in the target section Z3 is the third average blood pressure level ABL3, and the tail average blood pressure level in the immediately preceding section Z1 having no level change is the first average blood pressure level ABL1. Therefore, in step S66, the one-beat reliability determination unit 351 determines whether or not the difference between the third average blood pressure level ABL3 and the first average blood pressure level ABL1 is greater than or equal to the level threshold value ABLth.

Here, it is assumed that the one-beat reliability determination unit 351 has determined that the difference between the third average blood pressure level ABL3 and the first average blood pressure level ABL1 is greater than or equal to the level threshold value ABLth ("YES" in step S66). In this case, the one-beat reliability determination unit 351 determines that there is a blood pressure level change in the section Z3 (change point CP2) (step S67). Then, the one-beat reliability determination unit 351 records, in the memory 340, that there is a blood pressure level change with respect to the blood pressures of all the one beats belonging to the section Z3 (step S67).

On the other hand, it is assumed that the one-beat reliability determination unit 351 has determined that the difference between the third average blood pressure level ABL3 and the first average blood pressure level ABL1 is less than the level threshold value ABLth ("NO" in step S66). In this case, the one-beat reliability determination unit 351 proceeds to step S68. In this example, it is assumed that the difference between the third average blood pressure level ABL3 and the first average blood pressure level ABL1 is less than the level threshold value ABLth. Therefore, the process proceeds to step S68.

In step S68, the one-beat reliability determination unit 351 acquires a period from the tail of the immediately preceding section having no level change to the head of the target section. In this example, the period from the tail of the immediately preceding section Z1 having no level change (see change point CP1) to the head of the target section Z3 (see change point CP2) is a period T2 (see FIG. 16). Therefore, in step S68, the one-beat reliability determination unit 351 acquires the period T2 as the period from the tail of the immediately preceding section Z1 having no level change to the head of the target section Z3.

Next, in step S69, the one-beat reliability determination unit 351 determines whether or not the period T2 acquired in step S68 is larger than a period threshold value (Tth). Here, for example, it is assumed that the one-beat reliability determination unit 351 has determined that the period T2 acquired in step S68 is equal to or less than the period threshold value Tth ("NO" in step S69). In this case, the one-beat reliability determination unit 351 determines that there is no blood pressure level change in the target section Z3 (change point CP2) (step S70). Then, the one-beat reliability determination unit 351 records, in the memory 340, that there is no blood pressure level change with respect to the blood pressures of all the one beats belonging to the target section Z3 (step S70).

On the other hand, it is assumed that the one-beat reliability determination unit 351 has determined that the period T2 acquired in step S68 is larger than the period threshold value Tth ("YES" in step S69). In this case, the one-beat reliability determination unit 351 makes a blood pressure level change state in the target section Z3 the same as a blood pressure level change state in the section Z2 (referred to as a preceding section) existing between the immediately preceding section Z1 having no level change and the target section Z3 (step S71). Therefore, the one-beat reliability determination unit 351 records, in the memory 340, the same blood pressure level change state as in the section Z2, which is the preceding section, with respect to the blood pressures of all the one beats belonging to the target section Z3 (step S71). Here, as described above, it is assumed that there is a blood pressure level change in the section Z2. Therefore, in step S71, the one-beat reliability determination unit 351 records, in the memory 340, that there is a blood pressure level change with respect to the blood pressures of all the one beats belonging to the target section Z3. This is because there is an idea that even if the blood pressure level itself returns, it should not be treated as returning to the normal state if a very long period has elapsed from the tail of the immediately preceding section Z1 having no level change.

Steps S64 to S71 illustrated in FIG. 14 are performed on each section set for the time-series data BTD1 of the maximum blood pressure. Here, in a case where ∞ is adopted as the period threshold value Tth referred to in step S69, step S71 is not substantially performed, and step S70 is always performed.

Here, in step S62 of FIG. 14, the operation of detecting the change points CP1 and CP2 for the time-series data BTD1 of the maximum blood pressure has been described, but the validity of the change points CP1 and CP2 may be determined by the following method. Specifically, the validity of the change point may be determined using a body motion signal indicating the body motion of the subject whose blood pressure is to be measured. Here, the sphygmomanometer 200 is attached to the subject. Therefore, the measurement result of the motion sensor 220 of the sphygmomanometer 200 can be adopted as the body motion signal. As an example, the motion sensor 220 is a three-axis acceleration sensor.

Figure 17:
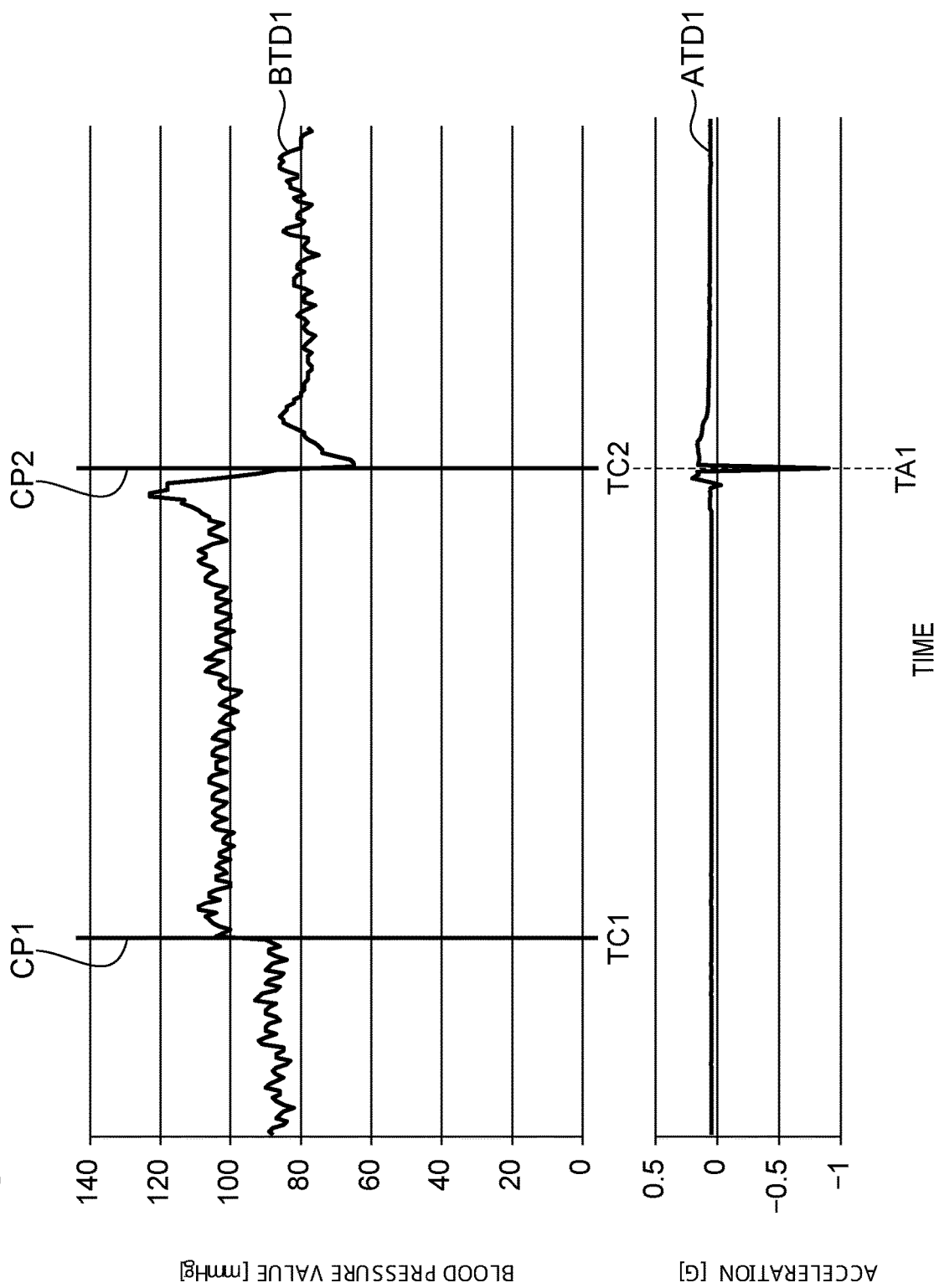
FIG. 17 is a diagram for explaining an operation of determining validity of the change point shown in FIG. 16.

An operation of determining the validity of the change points CP1 and CP2 will be described with reference to FIGS. 17 and 18. Here, in FIG. 17, the blood pressure value (mmHg) and the acceleration (G=9.8 m/s$^2$) are adopted as a vertical axis, and time is adopted as a horizontal axis. In the example of FIG. 17, the time-series data BTD1 of the maximum blood pressure and the time-series data ATD1 of the acceleration illustrated in FIG. 16 are illustrated. Here, the time-series data BTD1 of the maximum blood pressure and the time-series data ATD1 of the acceleration are arranged in the upper part and the lower part of FIG. 17 so that the time axes coincide with each other. In addition, the time-series data ATD1 of the acceleration is data indicating a temporal change of the measurement result by the motion sensor 220. In the present embodiment, since motion sensor 220 is a three-axis acceleration sensor, acceleration in three directions is measured. However, in FIG. 17, only the acceleration value in the y direction is illustrated as the time-series data ATD1 of the acceleration for simplification of the drawing.

Figure 18:
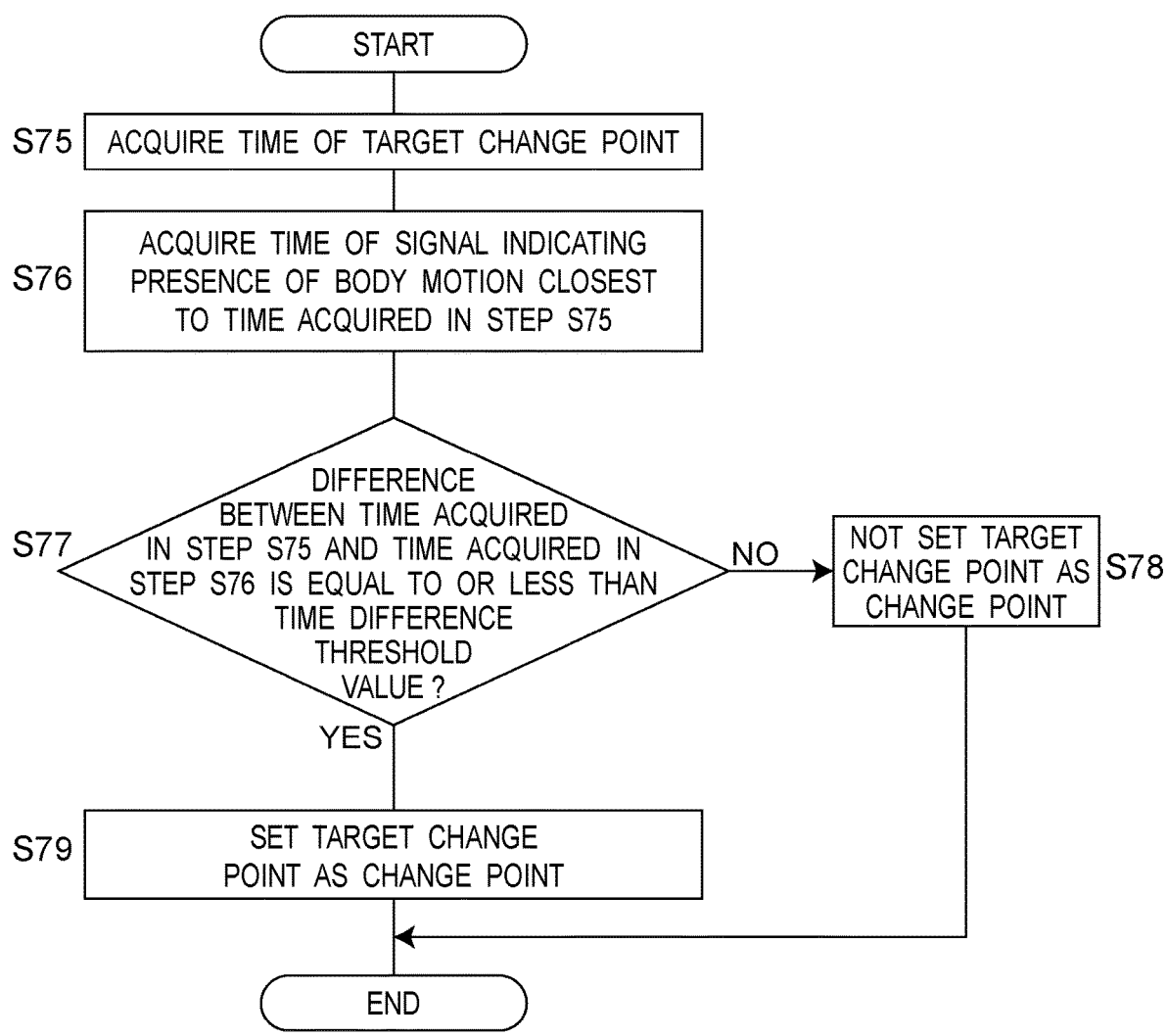
FIG. 18 is a flowchart for explaining an operation of determining the validity of the change point shown in FIG. 16.

FIG. 18 illustrates a flow for determining the validity of the change points CP1 and CP2. Here, FIG. 18 can be understood as a more specific flow of step S62 of FIG. 14 in a case of determining the validity of the change points CP1 and CP2. Hereinafter, an operation after the change points CP1 and CP2 are detected in step S62 of FIG. 14 will be described with reference to FIG. 18. The one-beat reliability determination unit 351 performs steps S75 to S79 illustrated in FIG. 18 for each of the change points CP1 and CP2 detected in step S62 of FIG. 14. Here, the change point that is the target for validity determination is referred to as a target change point.

When the target change point is the change point CP1, the one-beat reliability determination unit 351 acquires a time TC1 (see FIG. 17) of the target change point CP1 (step S75). Next, the one-beat reliability determination unit 351 acquires the time of the signal indicating the presence of body motion closest to the time TC1 acquired in step S75 (step S76). Here, the time of the signal indicating the presence of body motion is a measurement time point of an acceleration value of a predetermined magnitude or more. In the example of FIG. 17, in the time-series data ATD1 of the acceleration, only one acceleration value equal to or larger than the predetermined magnitude is observed, and the acceleration value is measured at a time TA1. Therefore, in step S76, the one-beat reliability determination unit 351 acquires the time TA1 as the time of the signal indicating the presence of body motion closest to the time TC1.

Next, in step S77, the one-beat reliability determination unit 351 compares a difference between the time TC1 acquired in step S75 and the time TA1 acquired in step S76 with a time difference threshold value (TDth). Here, a time difference threshold value TDth is variably preset in the blood pressure value analysis test device 300. Any value can be adopted as the time difference threshold value TDth. In the following description, the time difference threshold value TDth is in a range of 0 to 1 second in this example.

Specifically, in step S77, the one-beat reliability determination unit 351 determines whether or not the difference between the time TC1 and the time TA1 is equal to or less than the time difference threshold value TDth. In the example of FIG. 17, it is clear that the difference between the time TC1 and the time TA1 is larger than the time difference threshold value TDth (=0 to 1 second). Therefore, the one-beat reliability determination unit 351 determines that the difference between the time TC1 and the time TA1 is larger than the time difference threshold value TDth ("NO" in step S77), and determines that the target change point CP1 is not a valid change point (step S78). That is, the one-beat reliability determination unit 351 determines not to set the target change point CP1 as the change point (step S78). Thereafter, the one-beat reliability determination unit 351 ends the validity determination processing regarding the target change point CP1. Then, the one-beat reliability determination unit 351 changes the target change point to the change point CP2 and restarts the processing of step S75 and the subsequent steps in FIG. 18.

When the target change point is the change point CP2, the one-beat reliability determination unit 351 acquires a time TC2 (see FIG. 17) of the target change point CP2 (step S75). Next, the one-beat reliability determination unit 351 acquires the time of the signal indicating the presence of body motion closest to the time TC2 acquired in step S75 (step S76). In the example of FIG. 17, in the time-series data of the acceleration, only one acceleration value equal to or larger than the predetermined magnitude is observed, and the acceleration value is measured at a time TA1. Therefore, in step S76, the one-beat reliability determination unit 351 acquires the time TA1 as the time of the signal indicating the presence of body motion closest to the time TC2. Here, it is assumed that time TC2 and time TA1 are the same time.

Next, the one-beat reliability determination unit 351 compares a difference between the time TC2 acquired in step S75 and the time TA1 acquired in step S76 with the time difference threshold value TDth (step S77). Here, as described above, the time difference threshold value TDth is set to 0 to 1 second.

In step S77, the one-beat reliability determination unit 351 determines whether or not the difference between the time TC2 and the time TA1 is equal to or less than the time difference threshold value TDth. As described above, since the time TC2 and the time TA1 are the same time, the difference between the time TC2 and the time TA1 is 0 (zero). Therefore, the one-beat reliability determination unit 351 determines that the difference between the time TC2 and the time TA1 is equal to or less than the time difference threshold value TDth ("YES" in step S77). Then, the one-beat reliability determination unit 351 determines that the target change point CP2 is a valid change point (step S79). That is, the one-beat reliability determination unit 351 determines to adopt the target change point CP2 as the change point (step S79).

For all the change points CP1 and CP2 detected in step S62 in FIG. 14, the one-beat reliability determination unit 351 performs steps S75 to S79 in FIG. 18. Thereafter, the one-beat reliability determination unit 351 performs the section determination processing in step S63 in FIG. 14 using the change point CP2 determined to be valid.

(6) Attachment State Deterioration Detection (Step S6 in FIG. 7)

After step S5 in FIG. 7, step S6 is performed. That is, after the blood pressure level change detection processing in step S5 of FIG. 7 ends, the one-beat reliability determination unit 351 detects attachment state deterioration of the sphygmomanometer 200 for the subject (step S6 of FIG. 7). Here, the "attachment state deterioration" means, as described above, a state in which the attachment state of the sphygmomanometer 200 has changed with respect to the measurement target site of the subject, and the measurement result of the sphygmomanometer 200 is adversely affected (a state in which the sphygmomanometer 200 cannot measure normal blood pressure). Hereinafter, the operation of step S6 will be described.

For example, JP 2018-42606 A discloses "the pressure sensor 211 of the sphygmomanometer 200 presses the radial artery TD with weak force", "the pressure sensor 211 presses the radial artery TD with excessive force", "a state in which the pressure sensor 211 is inclined in a direction parallel to the extending direction of the radial artery TD (hereinafter referred to as "arterial direction").", "a state in which the pressure sensor 211 is inclined in a direction perpendicular to the extending direction of the radial artery TD (hereinafter referred to as "width direction").", "the pressure sensor 211 is shifted in the width direction.", "a state in which the pressure sensor 211 is shifted in the arterial direction", "a state in which the pressure sensor 211 is shifted in a rotational direction in a contact surface with a body surface.", and the like as aspects in which the attachment state is deteriorated.

Figure 19:
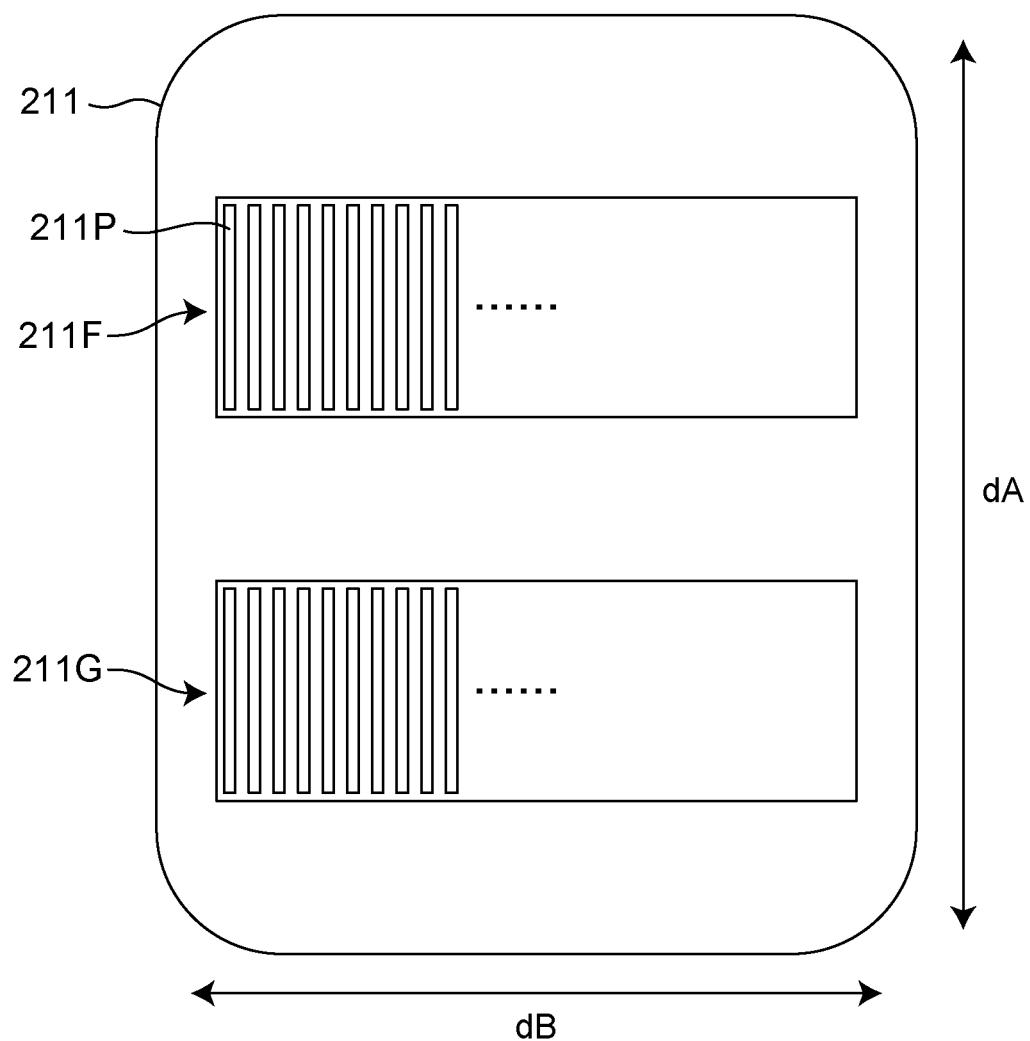
FIG. 19 is a plan view illustrating a specific configuration example of a pressure sensor illustrated in FIG. 4.

FIG. 19 illustrates a surface of the pressure sensor 211 on a side in contact with a body surface. FIG. 19 illustrates a direction dA and a direction dB. Here, the direction dA is a direction in which the radial artery TD existing at the attachment site extends in a state where the sphygmomanometer 200 is attached. The direction dB is a direction intersecting the direction dA. In the example of FIG. 19, the pressure sensor 211 includes two sensor arrays 211F and 211G, as described in JP 2018-42606 A. Each of the sensor arrays 211F and 211G includes a plurality of pressure sensor pieces 211p arranged along the direction dB.

In step S6 of FIG. 7, the one-beat reliability determination unit 351 determines the attachment state deterioration based on a distribution shape indicating a distribution, among the pressure sensors 211p, of the blood pressure value for each beat measured by each pressure sensor piece 211p. Note that a specific operation of the determination is disclosed in JP 2018-42606 A.

For example, it is assumed that the one-beat reliability determination unit 351 determines that two or more of "the pressure sensor 211 is inclined in the width direction", "the pressure sensor 211 is shifted in the width direction", "a state in which the pressure sensor 211 is shifted in the arterial direction", and "a state in which the pressure sensor 211 is shifted in the rotational direction" described in FIG. 17 of JP 2018-42606 A are applicable. In this case, with respect to the blood pressure of one beat to be determined, the one-beat reliability determination unit 351 determines that the deterioration in the sensor adhesion state is "present". Then, the one-beat reliability determination unit 351 records, in the memory 340, that there is attachment state deterioration with respect to the blood pressure of one beat. On the other hand, it is assumed that the one-beat reliability determination unit 351 determines that less than two of the four items are applicable. In this case, with respect to the blood pressure of one beat to be determined, the one-beat reliability determination unit 351 determines that the deterioration in the sensor adhesion state is "absent". Then, the one-beat reliability determination unit 351 records, in the memory 340, that there is no attachment state deterioration with respect to the blood pressure of one beat.

As described above, in step S6 of FIG. 7, the determination of presence or absence of the attachment state deterioration is sequentially performed for the blood pressure for each beat.

(7) Reliability Determination (Step S7 in FIG. 7)

After performing steps S3 to S6, the one-beat reliability determination unit 351 determines the reliability of the blood pressure for each beat using the results obtained through steps S3 to S6 (step S7 in FIG. 7). Next, in step S7, an operation of the processor 350 of the blood pressure value analysis support apparatus 300 will be described.

FIGS. 20A and 20B illustrate a result of performing the processing of steps S3 to S6 on first blood pressure of one beat to sixth blood pressure of one beat. That is, the one-beat reliability determination unit 351 can generate an individual determination item field of a table exemplified in FIG. 20A using the results of steps S3 to S6. Here, as described above, the determination results of steps S3 to S6 are recorded in the memory 340. Therefore, the one-beat reliability determination unit 351 can generate the individual determination item field of the table illustrated in FIG. 20A using each determination result recorded in the memory 340.

The one-beat reliability determination unit 351 inputs the result of step S3 (more specifically, steps S33 and S34 in FIG. 8) to a field of "outlier" provided in the table in FIG. 20A. The one-beat reliability determination unit 351 inputs the result of step S4 (more specifically, steps S44 and S45 in FIG. 12) to a field of "body motion (long unit section)" provided in the table in FIG. 20A. The one-beat reliability determination unit 351 inputs the result of step S4 (more specifically, steps S47 and S48 in FIG. 12) to a field of "body motion (short unit section)" provided in the table in FIG. 20A. The one-beat reliability determination unit 351 inputs the result of step S5 (more specifically, steps S67 and S70 in FIG. 14) to a field of "blood pressure level change" provided in the table in FIG. 20A. The one-beat reliability determination unit 351 inputs the determination result on the presence or absence of the attachment state deterioration obtained in step S6 to a field of "attachment state deterioration" provided in the table FIG. 20A.

In the example in the table of FIG. 20A, for example, regarding the first blood pressure of one beat, the one-beat reliability determination unit 351 determines that there is a blood pressure outlier in step S33 of FIG. 8, determines that there is no body motion in the long unit section in step S45 of FIG. 12, determines that there is no body motion in the short unit section in step S48 of FIG. 12, determines that there is no blood pressure level change in step S70 of FIG. 14, and determines that there is no attachment state deterioration in step S6 of FIG. 7.

In step S7 of FIG. 7, the results of the individual determination items for steps S3 to S6 exemplified in the table of FIG. 20A are summarized, and the reliability is determined for the blood pressure for each beat by the following method. For example, it is assumed that, in the blood pressure of one beat as the reliability determination target, at least one of the items of "outlier", "body motion (long unit section)", "body motion (short unit section)", "blood pressure level change", and "attachment state deterioration" is "present". In this case, the one-beat reliability determination unit 351 determines that the reliability is "low" with respect to the blood pressure of one beat as the reliability attitude determination target. On the other hand, it is assumed that, in the blood pressure of one beat as the reliability determination target, all of the items of "outlier", the "body motion (long unit section)", the "body motion (short unit section)", the "blood pressure level change", and the "attachment state deterioration" have been determined as "absent". In this case, the one-beat reliability determination unit 351 determines that the reliability is "high" with respect to the blood pressure of one beat as the reliability attitude determination target.

Therefore, in the example of the table FIG. 20A, for example, it has been determined that there is a blood pressure outlier with respect to the first blood pressure of one beat. Therefore, the one-beat reliability determination unit 351 determines that the reliability is "low" with respect to the first blood pressure of one beat. On the other hand, for example, in the sixth blood pressure of one beat, all of the items of "outlier", the "body motion (long unit section)", the "body motion (short unit section)", the "blood pressure level change", and the "attachment state deterioration" have been determined as "absent". Therefore, the one-beat reliability determination unit 351 determines that the reliability is "high" with respect to the sixth blood pressure of one beat.

In the example in the table of FIG. 20A, the reliability is determined on a two-point scale (high or low) with respect to the blood pressure for each beat. However, regarding the blood pressure for each beat, the reliability may be determined on a multiple-point scale. The table of FIG. 20B is an example in which the reliability is determined on a three-point scale of high, middle, and low, with respect to the blood pressure for each beat.

In the example in the table of FIG. 20B, it is assumed that, in the blood pressure of one beat of the reliability determination target, at least one of the items of "presence" among "outlier", "body motion (short unit section)", "blood pressure level change", and "attachment state deterioration" is "present". In this case, the one-beat reliability determination unit 351 determines that the reliability is "low" with respect to the blood pressure of one beat as the reliability attitude determination target. It is assumed that, in the blood pressure of one beat as the reliability determination target, all of the items of "outlier", the "body motion (long unit section)", the "body motion (short unit section)", the "blood pressure level change", and the "attachment state deterioration" have been determined as "absent". In this case, the one-beat reliability determination unit 351 determines that the reliability is "high" with respect to the blood pressure of one beat as the reliability attitude determination target. Furthermore, it is assumed that the item of "body motion (long unit section)" has been determined as "present", and that all of the items of "outlier", "body motion (short unit section)", "blood pressure level change", and "attachment state deterioration" other than the "body motion (long unit section)" have been determined as "absent", for the blood pressure of one beat of the confidence attitude determination target. In this case, the one-beat reliability determination unit 351 determines that the reliability is "middle", for the blood pressure of one beat as the reliability attitude determination target.

In this manner, the reliability determination operation in step S7 of FIG. 7 is sequentially performed for the blood pressure of each beat. Note that the one-beat reliability determination unit 351 records the reliability determined with respect to the blood pressure value of one beat in the memory 340 in association with the blood pressure value of one beat.

(8) Valid Section Setting and Invalid Section Setting (Step S8 in FIG. 7)

After the reliability is determined for all the blood pressures of one beat in step S7, the section setting unit 352 of the processor 350 performs step S8 illustrated in FIG. 7. In step S8, the section setting unit 352 sets the valid section and the invalid section for the time-series data of blood pressure based on the result of step S7 (that is, the determination result of the reliability of the blood pressure value for each beat). Here, the valid section can be grasped as a section to be used for analysis, and the invalid section can be grasped as a section not to be used for analysis. Next, in step S8, the operation of the processor 350 of the blood pressure value analysis support apparatus 300 will be described.

Figure 21:
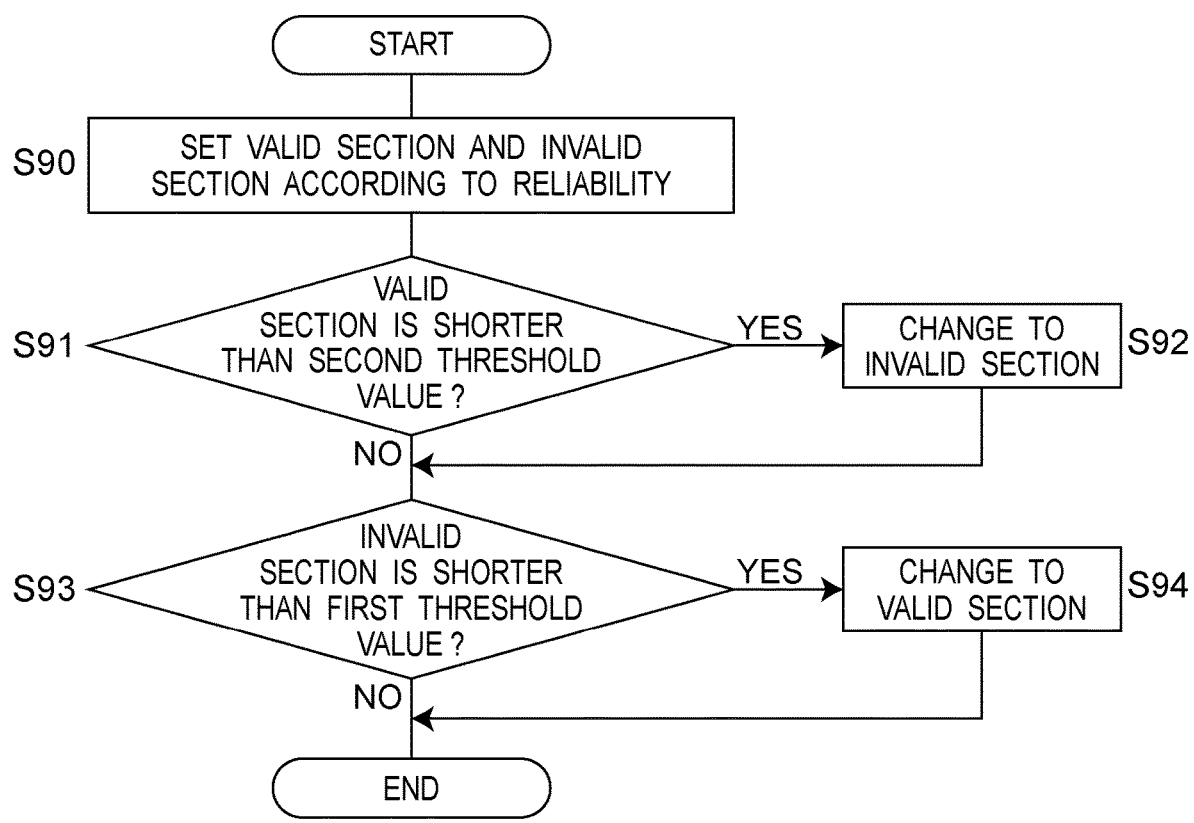
FIG. 21 is a flowchart for explaining an operation of setting a valid section and an invalid section.

FIG. 21 illustrates an operation of setting the valid section and the invalid section. First, the section setting unit 352 sets the valid section and the invalid section for the time-series data of blood pressure according to the determination result of the reliability of the blood pressure value for each beat (step S90). Specifically, for the time-series data of blood pressure, the section setting unit 352 includes a section in which the reliability of the blood pressure value for each beat is "high (which can be grasped as the first reliability)" in the valid section. Furthermore, for the time-series data of blood pressure, the section setting unit 352 includes, in the invalid section, a section in which the reliability of the blood pressure value for each beat is "low or middle (which can be grasped as the second reliability)".

Figure 22A:
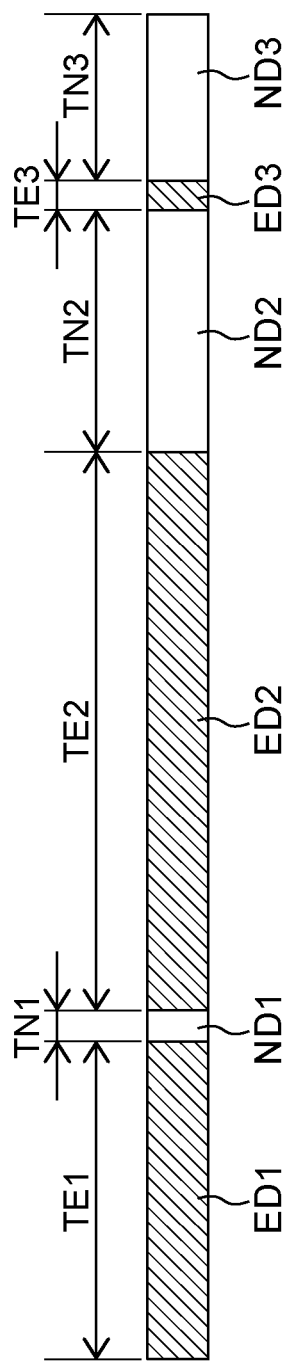
FIGS. 22A, 22B, and 22C are diagrams for explaining the operation of setting the valid section and the invalid section.

The section setting unit 352 performs the processing of step S90 on each of the blood pressure values for each beat. An example of the result is illustrated in FIG. 22A. FIG. 22A conceptually illustrates a state in which the measurement period of the time-series data of blood pressure is divided into a plurality of valid sections ED1, ED2, and ED3 and a plurality of invalid sections ND1, ND2, and ND3. In the example in FIG. 22A, a length of a period of the valid section ED1 is TE1, a length of a period of the valid section ED2 is TE2, and a length of a period of the valid section ED3 is TE3. On the other hand, a length of a period of the invalid section ND1 is TN1, a length of a period of the invalid section ND2 is TN2, and a length of a period of the invalid section ND3 is TN3.

Next, the section setting unit 352 performs the processing of step S91 on each of the valid sections ED1, ED2, and ED3 illustrated in FIG. 22A. In step S91 of FIG. 21, the section setting unit 352 compares the lengths TE1, TE2, and TE3 of the periods of the valid sections ED1, ED2, and ED3 with a second threshold value (TDdth2). Here, an arbitrary value can be set as the second threshold value TDdth2 using statistical processing or the like. In the following description, the second threshold value TDdth2 is 15 seconds. The second threshold value TDdth2 is variably preset in the memory 340 of the blood pressure value analysis support apparatus 300. Note that, in the following description, it is assumed that the length TE3 of the period is shorter than 15 seconds, and that the lengths TE1 and TE2 of the periods are 15 seconds or more.

Figure 22B:
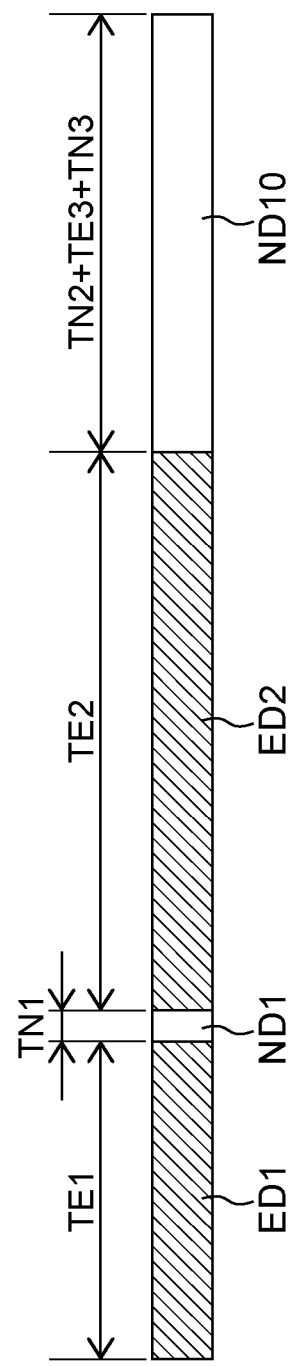

Specifically, in step S91, the section setting unit 352 determines whether the lengths TE1, TE2, and TE3 of continuous periods of the valid sections ED1, ED2, and ED3 are shorter than the second threshold value TDdth2. As described above, the length TE3 of the period of the valid section ED3 is less than the second threshold value TDdth2 (=15 seconds) ("YES" in step S91). Therefore, the section setting unit 352 changes the valid section ED3 to the invalid section (step S92). On the other hand, as described above, the lengths TE1 and TE2 of the periods of the valid sections ED1 and ED2 are larger than the second threshold value TDdth2 (=15 seconds) ("NO" in step S91). Therefore, the section setting unit 352 proceeds to step S93. FIG. 22B illustrates a state after the processing of steps S91 and S92 is performed on each of the valid sections ED1, ED2, and ED3.

As described above, in step S92, as illustrated in FIG. 22B, an invalid section ND10 is newly set. As can be seen from the above, the length of the period of the invalid section ND10 is TN2+TE3+TN3. On the other hand, the valid sections TE1 and TE2 are not changed to the invalid sections. Therefore, as illustrated in FIG. 22B, the valid sections TE1 and TE2 are maintained.

Next, the section setting unit 352 performs the processing of step S93 on each of the invalid sections ND1 and ND10. In step S93, the section setting unit 352 compares the lengths TN1 and (TN2+TE3+TN3) of the periods of the invalid sections ND1 and ND10, respectively, with the first threshold value (TDdth1). Here, an arbitrary value can be set as the first threshold value TDdth1 using statistical processing or the like. In the following description, the first threshold value TDdth1 is 15 seconds. The first threshold value TDdth1 is variably preset in the memory 340 of the blood pressure value analysis support apparatus 300. Note that, in the following description, it is assumed that the length TN1 of the period is shorter than 15 seconds, and the length of the period (TN2+TE3+TN3) is 15 seconds or more.

Figure 22C:
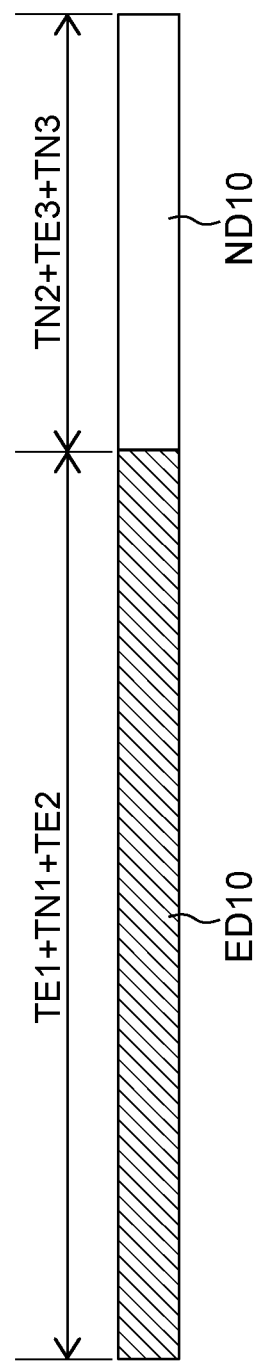

Specifically, in step S93, the section setting unit 352 determines whether or not the lengths TN1 and (TN2+TE3+TN3) of continuous periods of the invalid sections ND1 and ND10, respectively, are shorter than the first threshold value TDdth1. As described above, the length TN1 of the period of the invalid section ND1 is less than the first threshold value TDdth1 (=15 seconds) ("YES" in step S93). Therefore, the section setting unit 352 changes the invalid section ND1 to the valid section (step S94). On the other hand, as described above, the length (TN2+TE3+TN3) of the period of the invalid section ND10 is larger than the first threshold value TDdth1 (=15 seconds) ("NO" in step S93). Therefore, the section setting unit 352 ends the section setting process. FIG. 22C illustrates a state after the processing of steps S93 and S94 is performed on each of the invalid sections ND1 and ND10.

As described above, in step S94, as illustrated in FIG. 22C, a valid section ED10 is newly set. As can be seen from the above, a length of a period of the valid section ED10 is TE1+TN1+TE2. On the other hand, the invalid period ND10 is not changed to the valid section. Therefore, as illustrated in FIG. 22C, the invalid section ND10 illustrated FIG. 22B is maintained.

For each of the sections ED1, ED2, ED3, ND1, ND2, and ND3 set in step S90, the section setting unit 352 stores the result (the valid section ED10 and the invalid section ND10 illustrated in FIG. 22C) of the processing of step S91 and the subsequent steps in association with the time-series data of blood pressure, the time (for example, the section start time and the section end time), and the like, in the memory 340 of the blood pressure value analysis support apparatus 300. Note that the section setting processing described in step S8 of FIG. 7 may be performed using a method using a result obtained by performing a filter using a convolution operation and a predetermined threshold value.

(9) Generate Output Data (Step S9 in FIG. 7)

After the section setting unit 352 performs the processing of step S8 (valid section and invalid section setting processing), the processor 350 performs the processing of step S9 of FIG. 7. The output data generation unit 353 of the processor 350 generates various types of output data using the data, results, and the like obtained in the processing of steps S2 to S8 (step S9).

For example, various types of measurement data (including the time-series data of blood pressure) transmitted in step S2 are recorded in the memory 340. The determination result obtained in step S3 (more specifically, steps S21, S22, S24, S25, S27, S28, S30, S31, S33, and S34 in FIG. 8) is recorded in the memory 340. The determination result obtained in step S4 (more specifically, steps S44, S45, S47, S48, S50, and S51 in FIG. 12) is recorded in the memory 340. The determination result obtained in step S5 (more specifically, steps S67 and S70 in FIG. 14) is recorded in the memory 340. In addition, the determination result obtained in step S6 (the determination result regarding the presence or absence of attachment state deterioration) is recorded in the memory 340. The determined reliability (see FIGS. 20A and 20B) obtained in step S7 is recorded in the memory 340. Furthermore, information regarding the valid section and the invalid section obtained in step S9 (more specifically, steps S90, S92, and S94) is recorded in the memory 340. The output data generation unit 353 generates various types of output data using these data, results, and the like recorded in the memory 340 (step S9).

For example, in step S9, the output data generation unit 353 reads information regarding the valid section from the memory 340. Then, the output data generation unit 353 extracts information regarding the section start time of the valid section and the section end time of the valid section from the information regarding the valid section. Then, the output data generation unit 353 generates output data OD1 including the section start time and the section end time in the valid section. FIG. 23A illustrates an example of the output data OD1. In the example in FIG. 23A, an identification number (ID) of each valid section obtained in step S9, the section start time of each valid section, and the section end time of each valid section are configured as a table. Note that the output data generation unit 353 stores the generated output data OD1 in the memory 340.

Furthermore, for example, in step S9, the output data generation unit 353 reads, from the memory 340, the time-series data of blood pressure, the data related to the determined reliability, the data related to the determined body motion, the data related to the determined blood pressure level change, the data related to the determined blood pressure outlier, the data related to the determined attachment state deterioration, and the like. Then, the output data generation unit 353 extracts the blood pressure value for each beat and the measurement time for the blood pressure value for each beat from the time-series data of blood pressure. Then, the output data generation unit 353 generates output data OD2 including information indicating the time when the blood pressure value for each beat was measured, the reliability, and the disturbance (determination result of body motion, determination result of blood pressure level change, determination result of blood pressure outlier, determination result of attachment state deterioration, and the like). FIG. 23B illustrates an example of the output data OD2.

In the example FIG. 23B, identification numbers (IDs) of a plurality of blood pressures of one beat constituting the time-series data of blood pressure, the time when each of the blood pressures of one beat is measured, the reliability of the blood pressure value for each beat (determination result of step S7 in FIG. 7), the presence or absence of body motion at the time of measuring the blood pressure value for each beat (determination results in steps S50 and 51 in FIG. 12), the presence or absence of a blood pressure level change at the time of measuring the blood pressure value for each beat (determination results in steps S67 and 70 in FIG. 14), the presence or absence of an outlier of the blood pressure value for each beat (determination results in steps S33 and 34 in FIG. 8), and the presence or absence of attachment state deterioration at the time of measuring the blood pressure value for each beat (determination result of step S6 in FIG. 7) are configured as a table. Note that the output data generation unit 353 stores the generated output data OD2 in the memory 340.

Here, the output data generation unit 353 may increase or decrease the items of information indicating disturbance illustrated in FIG. 23B. For example, the output data generation unit 353 may generate output data including only the determination result of the body motion as an item of the information indicating disturbance. In this case, the output data includes identification numbers of a plurality of blood pressures of one beat constituting the time-series data of blood pressure, the time when each of the blood pressures of one beat was measured, the reliability of the blood pressure value for each beat (determination result of step S7 in FIG. 7), and the presence or absence of body motion at the time of measuring the blood pressure value for each beat (determination results in steps S50 and 51 in FIG. 12) in the table. Furthermore, for example, the output data generation unit 353 may generate a table of output data including all the determination results in steps S3 to S6 (each of determination results of steps S21, S22, S24, S25, S27, S28, S30, S31, S33, and S34 of FIG. 8, steps S44, S45, S47, S48, S50, and S51 of FIG. 12, and steps S67, S70, and S6 of FIG. 14) as items of the information indicating disturbance.

Note that the output data OD1 and OD2 generated by the output data generation unit 353 may be displayed on the display devices 320 and 400.

(10) Display of Valid Section and the Like (Step S10 in FIG. 7)

Next, display of various types of information (data) will be described. The display device 320 (see FIG. 5) of the blood pressure value analysis support apparatus 300 and/or the display device 420 (see FIG. 6) of the hospital terminal 400 display(s) the valid section and/or the reliability, in a visually recognizable manner, along the time-series data of blood pressure (step S10 in FIG. 7). Each of the display devices 320 and 420 can display the valid section and/or the reliability using various types of data and information stored in the memory 340 in the blood pressure value analysis support apparatus 300. For example, the output data generation unit 353 generates each output data so as to display each image as will be described later on the display screen of the display device 320, 420. That is, the display device 320, 420 displays each image as will be described later based on each output data.

Figure 24:
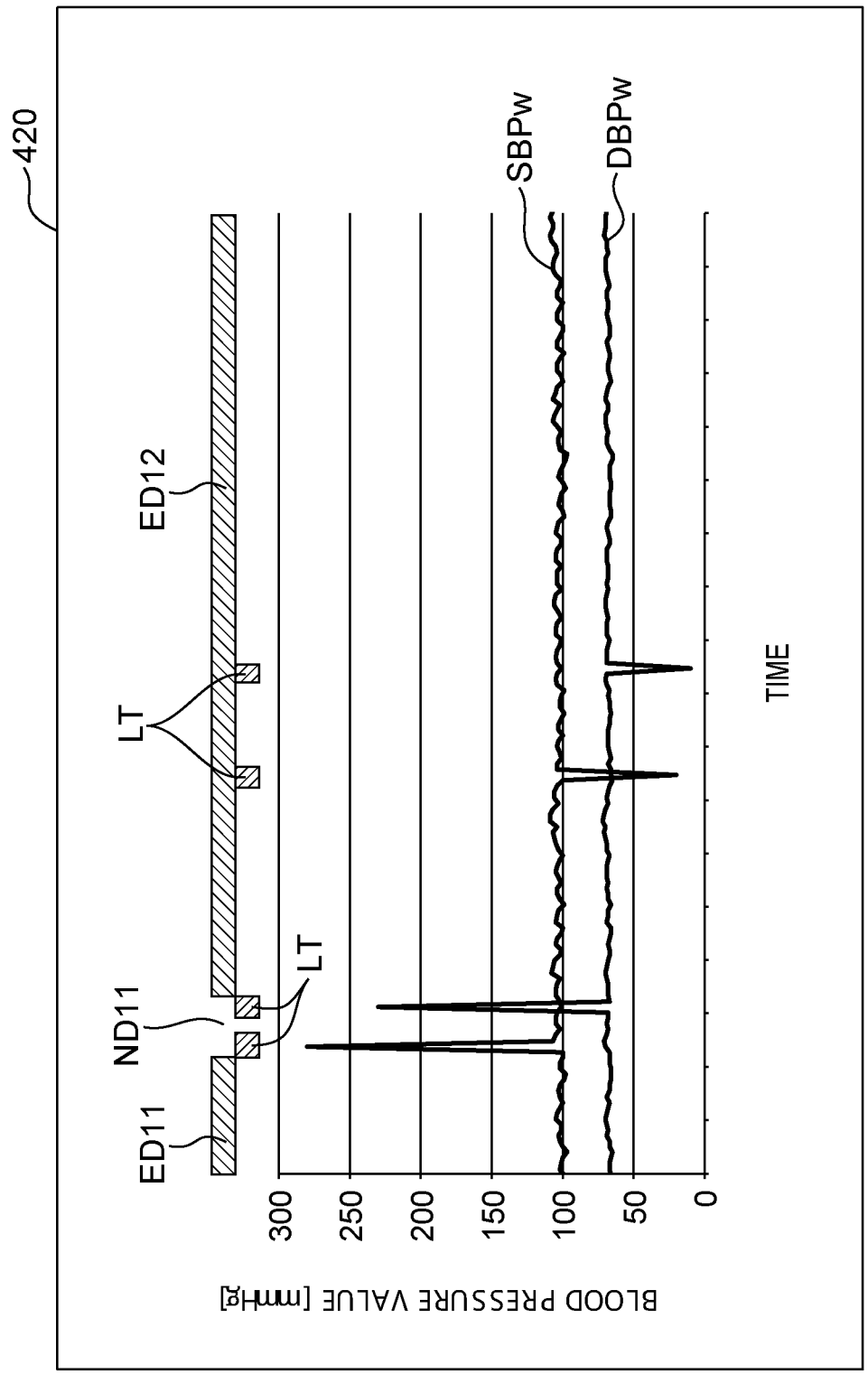
FIG. 24 is a diagram illustrating an example of an image (including the valid section and the invalid section) displayed on a display device.

For example, the display device 420 of the hospital terminal 400 can receive output data from the blood pressure value analysis support apparatus 300 via the network 50 and display an image as illustrated in FIG. 24. A vertical axis in FIG. 24 represents the blood pressure value (mmHg), and a horizontal axis in FIG. 24 represents time. FIG. 24 includes time-series data SBPw of the maximum blood pressure value and time-series data DBPw of the minimum blood pressure value as the time-series data of blood pressure. In addition, FIG. 24 includes two valid sections ED11 and ED12. Further, a low reliability label LT is included in FIG. 24. Here, the low reliability label LT is a label indicating a period in which a blood pressure value for each beat having low reliability is displayed. In other words, the blood pressure value for each beat in the low reliability label LT has been determined to have low reliability in step S7 of FIG. 7. In an example of FIG. 24, the valid sections ED11 and ED12 and the low reliability label LT are included as a display target. However, in addition to the above, the presence or absence of body motion and/or the presence or absence of a change in blood pressure level exemplified in FIG. 23B may be displayed as the display target in a visually recognizable manner.

In the example of FIG. 24, it can be grasped that a section between the valid section ED11 and the valid section ED12 is an invalid section ND11. Therefore, the display screen of FIG. 24 also includes the time-series data SBPw of the maximum blood pressure value, the time-series data DBPw of the minimum blood pressure value, and the low reliability label LT in the invalid section ND11. There is a high possibility that the time-series data of blood pressure and the like in the invalid section ND11 are not used for analysis or the like. Therefore, the display device 420 may perform the following display using various types of data and information stored in the memory 340 in the blood pressure value analysis support apparatus 300. That is, the display device 420 displays, in a visually recognizable manner, the time-series data SBPw and DBPw of blood pressure and the reliability (low reliability label LT) in the valid sections ED11 and ED12 for each of the valid sections ED11 and ED12 (see FIG. 25). Then, the display device 420 omits display of the time-series data SBPw and DBPw of blood pressure and the reliability (low reliability label LT) in the invalid section ND11 (see FIG. 25).

Figure 25:
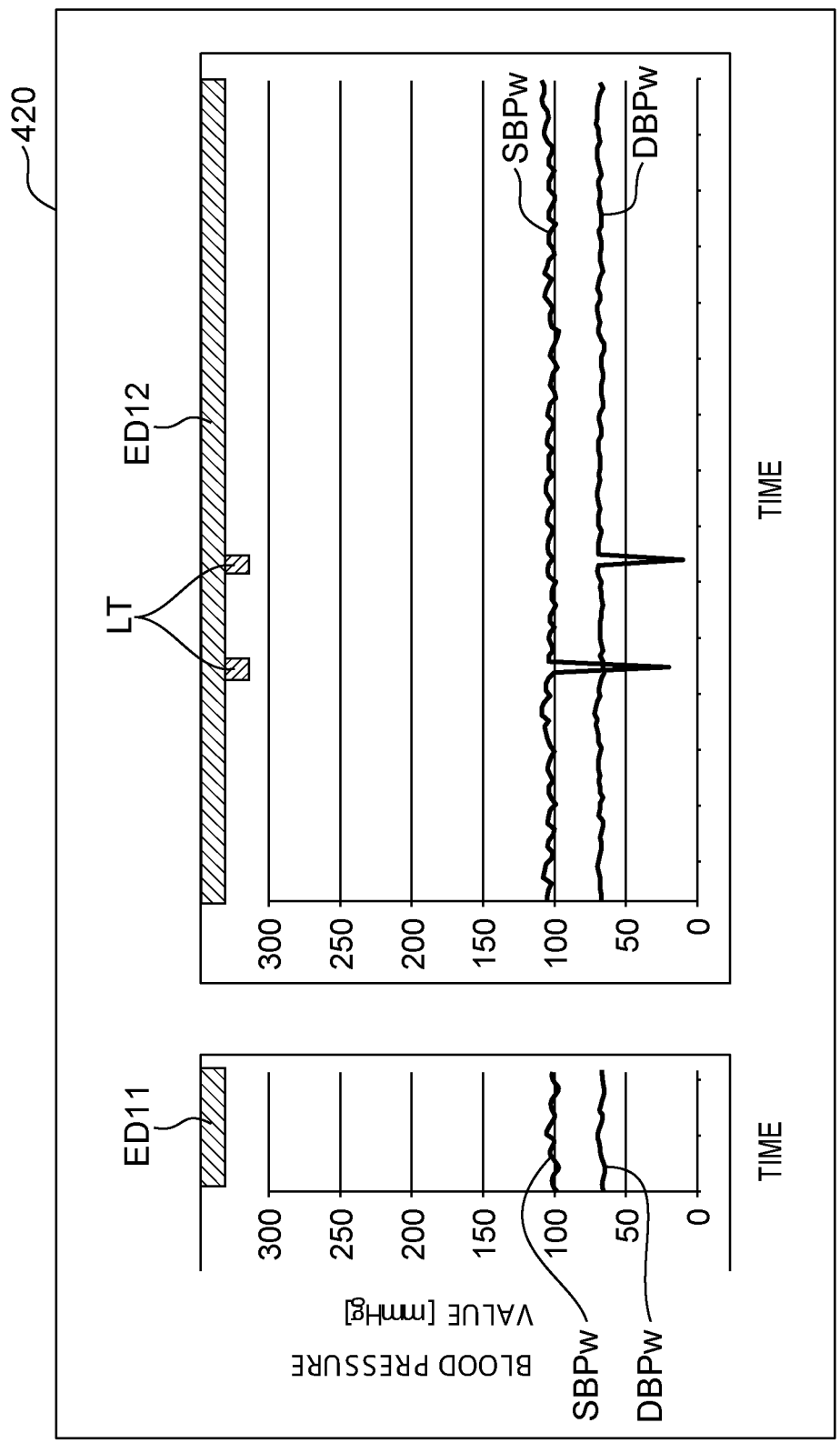
FIG. 25 is a diagram illustrating an example of an image (display of an invalid section is omitted) image displayed on the display device.

As illustrated in FIG. 25, the display device 420 displays all the valid sections (in the example of FIG. 25, the valid section ED11 and the valid section ED12) side by side. That is, all the valid sections ED11 and ED12 are displayed in one screen (however, the adjacent valid sections ED11 and ED12 are separated so that the adjacent valid sections ED11 and ED12 can be distinguished from each other). Therefore, in the example of FIG. 25, the time-series data SBPw and DBPw of blood pressure and the reliability (low confidence label LT, but no low confidence label LT in example of FIG. 25) in the valid section ED11 are displayed in a visually recognizable manner, and the time-series data SBPw and DBPw of blood pressure and the reliability (low reliability label LT) in the valid section ED12 are displayed in a visually recognizable manner.

Furthermore, as is clear from FIG. 25, the display device 420 does not display the time-series data SBPw or DBPw of blood pressure or the reliability (low reliability label LT) in the invalid section ND11. As in FIG. 24, a vertical axis in FIG. 25 represents the blood pressure value (mmHg), and a horizontal axis in FIG. 25 represents time.

Furthermore, in a case where a plurality of valid sections are generated, the following display mode can be adopted in addition to the display mode of displaying the plurality of valid sections on one screen. That is, the display device 420 may switchably display the valid section according to the operation from the user such that one valid section is displayed on one screen (see FIGS. 26 and 27).

Figure 26:
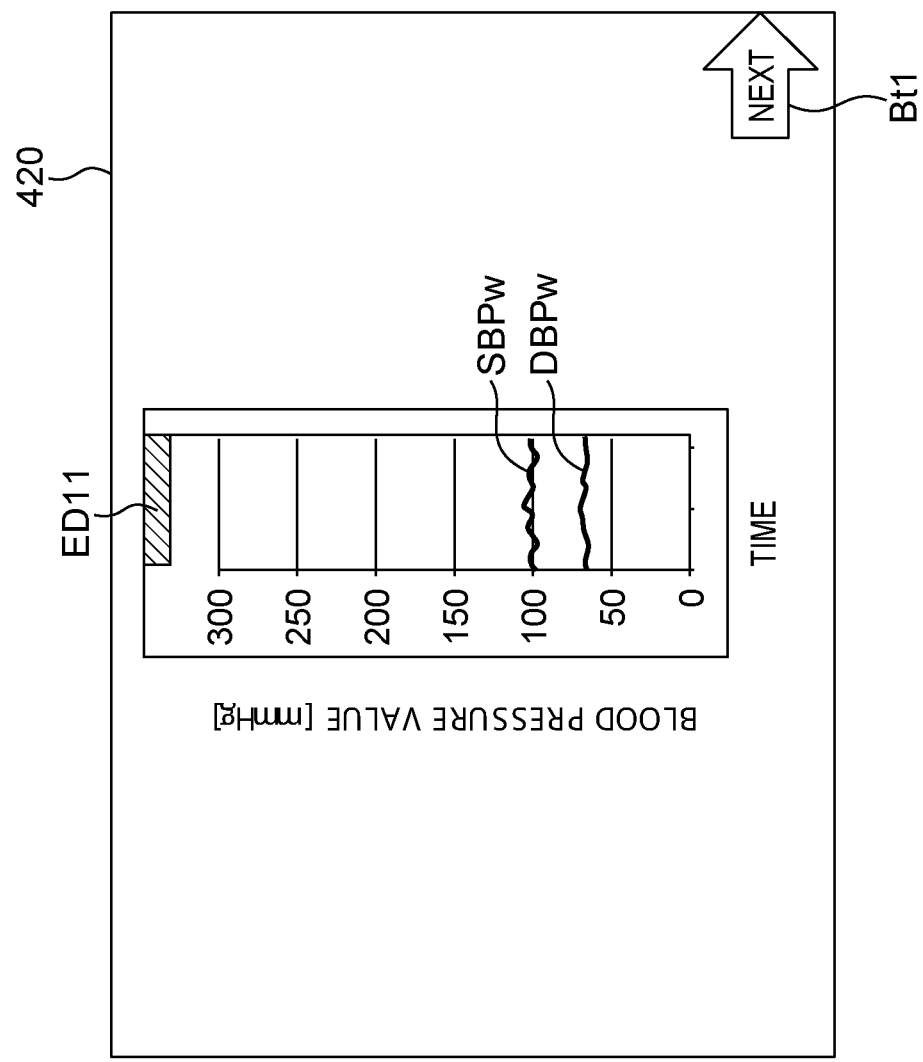
FIG. 26 is a diagram for explaining an example of a display switching operation of each valid section in a case where there are a plurality of valid sections.

As illustrated in FIG. 26, the display device 420 displays the valid section ED11 and information (blood pressure time-series data SBPw and DBPw and the reliability (low reliability label LT)) in the valid section ED11 on one screen. Then, the display device 420 does not display the other valid section ED12 or information (time-series data SBPw and DBPw of blood pressure and the reliability (low reliability label LT)) in the other valid section ED12. Here, as illustrated in FIG. 26, the display device 420 also displays an operation icon Bt1 for instructing display of the next valid section.

It is assumed that the user selects the operation icon Bt1 displayed on the display device 420 via the operation device 430 (see FIG. 6) of the hospital terminal 400. In this case, the display device 420 displays the valid section ED12 that is adjacent to the valid section ED11 and appears after the valid section ED11 in time-series (see FIG. 27).

Figure 27:
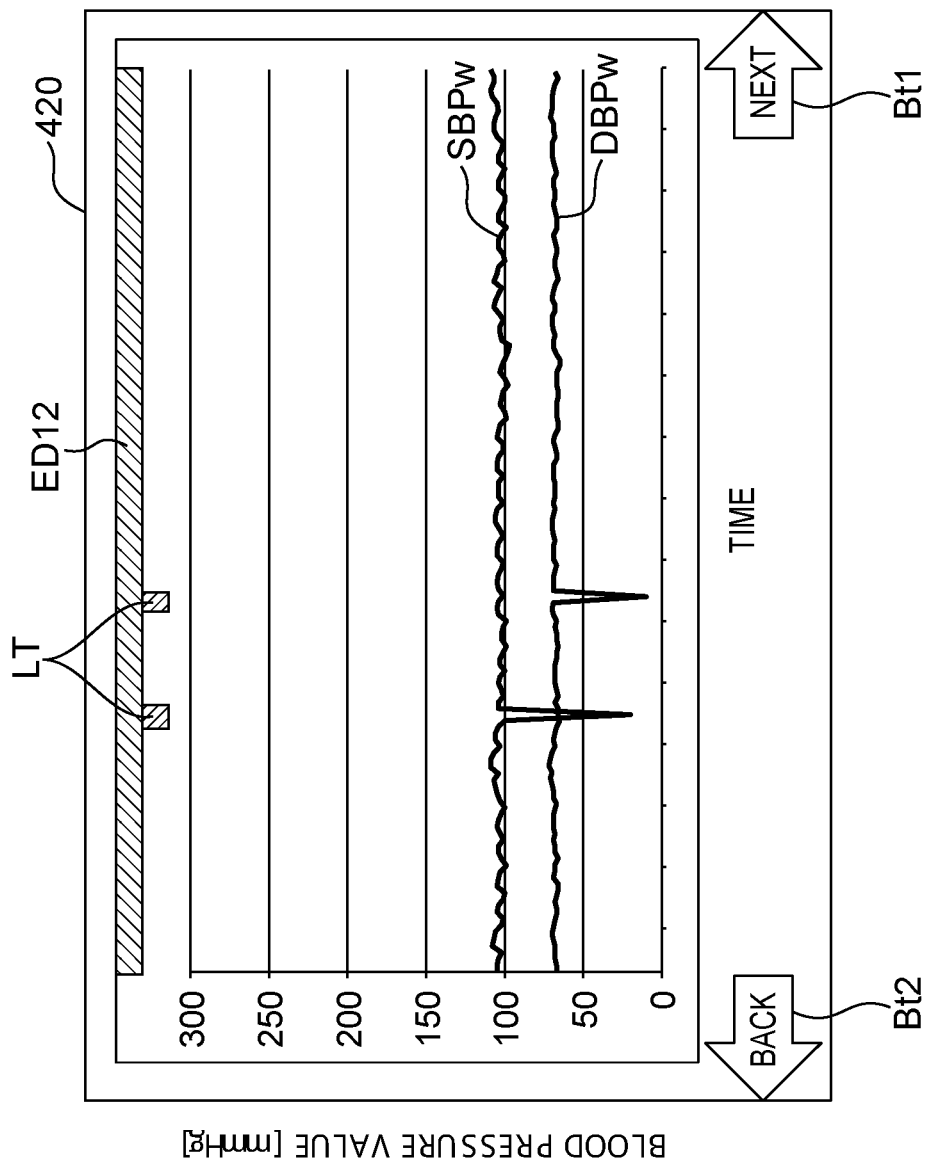
FIG. 27 is a diagram for explaining an example of the display switching operation of each valid section in the case where there are a plurality of valid sections.

As illustrated in FIG. 27, the display device 420 displays the valid section ED12 and information (time-series data SBPw and DBPw of blood pressure and the reliability (low reliability label LT)) in the valid section ED12 on one screen. Then, the display device 420 does not display the other valid section ED11 or information (time-series data SBPw and DBPw of blood pressure and the reliability (low reliability label LT)) in the other valid section ED11. Here, as illustrated in FIG. 27, the display device 420 also displays an operation icon Bt1 for instructing display of the next valid section. Further, the display device 420 also displays an operation icon Bt2 for instructing the display of the previous valid section.

In FIG. 27, it is assumed that the user selects the operation icon Bt1 displayed on the display device 420 via the operation device 430 (see FIG. 6). In this case, the display device 420 displays a valid section ED13 (not illustrated) that is adjacent to the valid section ED12 and appears after the valid section ED12 in time-series.

On the other hand, in FIG. 27, it is assumed that the user selects the operation icon Bt2 displayed on the display device 420 via the operation device 430 (see FIG. 6). In this case, the display device 420 displays the valid section ED11 that is adjacent to the valid section ED12 and appears before the valid section ED12 in time-series (see FIG. 26).

The same operation and display as described above can also be performed by the operation device 330 and the display device 320 of the blood pressure value analysis support apparatus 300.

(Effects)

In the blood pressure value analysis support system 100 and the blood pressure value analysis support apparatus 300 according to the present embodiment, the one-beat reliability determination unit 351 determines the reliability of the blood pressure value for each beat, based on information indicating disturbance, for the time-series data of blood pressure, using at least the first reliability (for example, high) and the second reliability (for example, low). For the time-series data of blood pressure, the section setting unit 352 includes a section in which the reliability of the blood pressure value for each beat is the first reliability in the valid section, and, on the other hand, includes a section in which the reliability of the blood pressure value for each beat is the second reliability in the invalid section (see FIGS. 22A-22C). Then, the section setting unit 352 changes the invalid section in which the length of the continuous period is less than the preset first threshold value TDth1 to the valid section (see FIGS. 22A-22C). This is because it is considered that there is a little influence on the analysis of the blood pressure variation index that occurs over a relatively long time of several seconds to several tens of seconds, such as a blood pressure surge.

Therefore, even if the blood pressure value data having the second reliability which is relatively low in reliability continuously appears over a relatively short period, the blood pressure value data is included in the valid section. Here, as described above, the valid section represents a section to be used for analysis for the time-series data of blood pressure. Therefore, the blood pressure value analysis support apparatus 300 can increase a number of data included in the valid section. Therefore, for example, when detecting the blood pressure variation index such as the blood pressure surge, it is possible to appropriately set the section to be used for analysis of blood pressure data and the section not to be used for analysis in the time-series data of blood pressure.

In the blood pressure value analysis support apparatus 300 according to the present embodiment, the section setting unit 352 changes the valid section in which the length of the continuous period is less than the preset second threshold value TDth2 to the invalid section (see FIG. 22C).

Therefore, it is possible to more accurately exclude a period that is considered to be better not to be used at the time of analysis from the valid section. For example, it is assumed that two invalid sections exist and that a valid section of a relatively short period exists between the invalid sections. In this case, it may not be preferable to use the blood pressure value data measured in the valid section in the analysis. Therefore, in this case, the blood pressure value analysis support apparatus 300 can treat the valid section of the relatively short period as the invalid section. Therefore, at the time of analysis, the use of the blood pressure value data included in the valid section of the relatively short period can be avoided.

In the blood pressure value analysis support apparatus 300 according to the present embodiment, the one-beat reliability determination unit 351 determines the reliability based on the maximum blood pressure value SBP of the blood pressure for each beat and the preset maximum blood pressure threshold values SBPth1 and SBPth2.

Therefore, the reliability is determined using the maximum blood pressure value SBP of the blood pressure of one beat. The maximum blood pressure value SBP greatly affects the reliability of the blood pressure value. Therefore, it is possible to determine the reliability with high accuracy.

In the blood pressure value analysis support apparatus 300 according to the present embodiment, the one-beat reliability determination unit 351 determines the reliability based also on the minimum blood pressure value DBP of the blood pressure for each beat and the minimum blood pressure threshold values DBPth1 and DBPth2 set in advance.

Therefore, the reliability is determined using not only the maximum blood pressure value SBP but also the minimum blood pressure value DBP. Therefore, the accuracy of the reliability determination can be further improved.

In the blood pressure value analysis support apparatus 300 according to the present embodiment, the one-beat reliability determination unit 351 determines the reliability based also on the pulse pressure PP, which is a difference between the maximum blood pressure value SBP and the minimum blood pressure value DBP of the blood pressure for each beat, and the pulse pressure threshold values PPth1 and PPth2 set in advance.

Therefore, the reliability is determined using not only the maximum blood pressure value but also the pulse pressure PP. Therefore, the accuracy of the reliability determination can be further improved.

In the blood pressure value analysis support apparatus 300 according to the present embodiment, the one-beat reliability determination unit 351 determines the reliability based also on a beat time PT that is one cycle of the blood pressure of one beat and preset beat time threshold values PTth1 and PTth2.

Therefore, the reliability is determined using not only the maximum blood pressure value but also the beat time PT. Therefore, the accuracy of the reliability determination can be further improved.

In the blood pressure value analysis support apparatus 300 according to the present embodiment, the one-beat reliability determination unit 351 determines the reliability based on the statistical value of the motion data indicating the motion of the subject during the measurement with the sphygmomanometer 200 and at least one preset motion threshold value $\alpha$th1 or $\alpha$th2 (see step S4 in FIG. 7).

When the subject moves during the measurement, the possibility that a valid blood pressure value may not be measured increases. Therefore, by determining the reliability in consideration of the statistical value of the motion, the accuracy of the reliability can be enhanced.

The blood pressure value analysis support apparatus 300 according to the present embodiment determines the reliability in consideration of the movement variation over a relatively long period and the movement variation over a relatively short period (see FIG. 13). Therefore, it is possible to determine the reliability with higher accuracy.

The blood pressure value analysis support apparatus 300 according to the present embodiment determines the reliability based on the presence or absence of the blood pressure level change at the change points CP1 and CP2 in the time-series data of blood pressure. The blood pressure level change is caused by, for example, disturbance during the measurement. The disturbance affects data reliability. Therefore, by determining the reliability based on the presence or absence of the blood pressure level change, it is possible to determine the reliability with high accuracy.

In the blood pressure value analysis support apparatus 300 according to the present embodiment, the sphygmomanometer 200 includes a plurality of pressure sensor pieces 211*p* arranged along a direction intersecting the artery (see a direction dB in FIG. 19) by tonometry. Then, the one-beat reliability determination unit 351 determines the reliability based on a distribution shape indicating a distribution among the pressure sensor pieces 211*p* of the blood pressure value for one beat measured by each pressure sensor piece 211*p*.

An arrangement state of the sphygmomanometer 200 with respect to the measurement target site (artery) can be estimated based on the distribution shape. The change in the arrangement state affects the measurement result. Therefore, by determining the reliability based on the distribution shape, it is possible to determine the reliability with high accuracy.

The blood pressure value analysis support apparatus 300 according to the present embodiment includes the output data generation unit 353 that generates output data (see FIG. 23B) including information indicating the time when the blood pressure value for each beat was measured, the reliability, and the disturbance.

Various types of information (information indicating measurement time, reliability, and disturbance) can be managed in an organized state by generating the output data. Furthermore, by using the output data, it is also possible to display the various types of information on a monitor or the like.

In the blood pressure value analysis support apparatus 300 according to the present embodiment, the output data generation unit 353 generates output data including the section start time and the section end time in the valid section (see FIG. 23A). Therefore, the information regarding the period of the valid section can be managed. In addition, by using the output data, it is also possible to display the period of the valid section in a visually recognizable manner on a monitor or the like.

In the blood pressure value analysis support system 100 according to the present embodiment, the output data generation unit 353 displays the valid sections ED11 and ED12, the time-series data of blood pressure, and the reliability (for example, the low confidence label LT) on the display screen of the display device 320, 420, and generates the output data so as not to display the time-series data of blood pressure and the reliability in the invalid section ND11 on the display screen of the display device 320, 420. Therefore, a doctor or the like can easily determine the portion of the time-series data of blood pressure to be used for analysis by viewing the display screen of the display device 320, 420. Therefore, it is also possible to shorten the time for confirmation by the doctor or the like.

In the blood pressure value analysis support system 100 of the present embodiment, the time-series data (see time-series data SBPw of maximum blood pressure and time-series data DBPw of minimum blood pressure in FIG. 25) and the reliability (for example, the low confidence label LT) of the blood pressure in the valid sections are displayed on the display screen of the display device 320, 420 for each of the valid sections ED11 and ED12. On the other hand, the time-series data of blood pressure and the reliability in the invalid section ND11 are not displayed. Therefore, it is possible to prevent the doctor or the like from visually recognizing the time-series data of blood pressure or the like that should not be used for analysis on the display device, and it is possible to improve the efficiency of confirmation by the doctor.

A program for causing a computer to execute the above-described blood pressure value analysis support method is set in the blood pressure value analysis support apparatus. The blood pressure value analysis support method can be carried out by causing a computer to execute the program.

In addition, in the above-described embodiment, each processor 260, 350, 450 includes a CPU, but the present invention is not limited thereto. Each processor 260, 350, 450 may include a logic circuit (integrated circuit) such as a programmable logic device (PLD) or a field programmable gate array (FPGA).

In the above embodiment, the sphygmomanometer 400 is a tonometry-type sphygmomanometer, but the present invention is not limited thereto. The sphygmomanometer 400 may include a light emitting element that emits light toward an artery passing through a corresponding portion of the measurement target site and a light receiving element that receives reflected light (or transmitted light) of the light, and may continuously detect a pulse wave of the artery based on a change in volume (photoelectric type). In addition, the sphygmomanometer 400 may include a piezoelectric sensor in contact with the measurement target site, detect distortion due to pressure of an artery passing through a corresponding portion of the measurement target site as a change in electric resistance, and continuously detect blood pressure based on the change in electric resistance (piezoelectric type). Furthermore, the sphygmomanometer 400 may include a transmission element that transmits a radio wave (transmission wave) toward an artery passing through a corresponding portion of the measurement target site and a reception element that receives a reflected wave of the radio wave, detect a change in distance between the artery and the sensor due to a pulse wave of the artery as a phase shift between the transmission wave and the reflected wave, and continuously detect the blood pressure based on the phase shift (radio wave irradiation method). In addition, as long as the physical quantity with which the blood pressure can be calculated can be observed, other methods may be applied.

In addition, the blood pressure value analysis support apparatus 300 according to the embodiment can support analysis of not only the blood pressure surge but also various blood pressure variation indexes such as an arterial baroreceptor reflex index (for example, the index can be analyzed from the slope of the waveform obtained by changing the frequency of the time-series data of blood pressure).

The above embodiment is an example, and various modifications can be made without departing from the scope of the present invention. Each of the plurality of embodiments described above can be established independently, but the embodiments can be combined. In addition, various features in different embodiments can be established independently, but features in different embodiments can be combined.

In the blood pressure value analysis support apparatus according to this embodiment, the one-beat reliability determination unit determines the reliability of the blood pressure value for each beat, based on information indicating disturbance, using at least the first reliability and the second reliability, for the time-series data of blood pressure. For the time-series data of blood pressure, the section setting unit includes a section in which the reliability of the blood pressure value for each beat is the first reliability in the valid section, and, on the other hand, includes a section in which the reliability of the blood pressure value for each beat is the second reliability in the invalid section. Then, the section setting unit changes the invalid section in which a length of a continuous period is less than a preset first threshold value to the valid section. This is because it is considered that there is a little influence on the analysis of the blood pressure variation index that occurs over a relatively long time of several seconds to several tens of seconds, such as a blood pressure surge. Therefore, even if the blood pressure value data having the second reliability which is relatively low in reliability continuously appears over a relatively short period, the blood pressure value data is included in the valid section. Here, as described above, the valid section represents a section to be used for analysis for the time-series data of blood pressure. Therefore, the blood pressure value analysis support apparatus can increase a number of data included in the valid section. Therefore, for example, when detecting the blood pressure variation index such as the blood pressure surge, it is possible to appropriately set the section to be used for analysis of blood pressure data and the section not to be used for analysis in the time-series data of blood pressure.

In the blood pressure value analysis support apparatus according to one embodiment, the section setting unit changes the valid section in which a length of a continuous period is less than a preset second threshold value to the invalid section.

In the blood pressure value analysis support apparatus according to the embodiment, it is possible to more accurately exclude a period that is considered to be better not to be used at the time of analysis from the valid section. For example, it is assumed that two invalid sections exist and that a valid section of a relatively short period exists between the invalid sections. In this case, it may not be preferable to use the blood pressure value data measured in the valid section in the analysis. Therefore, in this case, the blood pressure value analysis support apparatus can treat the valid section of the relatively short period as the invalid section. Therefore, at the time of analysis, the use of the blood pressure value data included in the valid section of the relatively short period can be avoided.

In the blood pressure value analysis support apparatus according to one embodiment,
the one-beat reliability determination unit determines the reliability based on a maximum blood pressure value of a blood pressure for each beat and a preset maximum blood pressure threshold value.

In the blood pressure value analysis support apparatus according to the embodiment, the reliability is determined using the maximum blood pressure value of a blood pressure of one beat. For example, when the blood pressure surge or the like is detected from the maximum blood pressure value, the maximum blood pressure value is one of factors that affect the reliability of the blood pressure value. Therefore, it is possible to determine the reliability with high accuracy.

In the blood pressure value analysis support apparatus according to one embodiment,
the one-beat reliability determination unit determines the reliability based also on a minimum blood pressure value of the blood pressure for each beat and a preset minimum blood pressure threshold value.

In the blood pressure value analysis support apparatus according to the embodiment, the reliability is determined using not only the maximum blood pressure value but also the minimum blood pressure value. Therefore, the accuracy of the reliability determination can be further improved.

In the blood pressure value analysis support apparatus according to one embodiment,
the one-beat reliability determination unit determines the reliability based also on a pulse pressure that is a difference between the maximum blood pressure value and the minimum blood pressure value of the blood pressure for each beat and a preset pulse pressure threshold value.

In the blood pressure value analysis support apparatus according to the embodiment, the reliability is determined using not only the maximum blood pressure value but also the pulse pressure. Therefore, the accuracy of the reliability determination can be further improved.

In the blood pressure value analysis support apparatus according to one embodiment,
the one-beat reliability determination unit determines the reliability based also on a beat time which is one cycle of the blood pressure of one beat and a preset beat time threshold value.

In the blood pressure value analysis support apparatus according to the embodiment, the reliability is determined using not only the maximum blood pressure value but also the beat time. Therefore, the accuracy of the reliability determination can be further improved.

In the blood pressure value analysis support apparatus according to one embodiment,
the one-beat reliability determination unit determines the reliability based on a statistical value of motion data indicating a motion of a subject during measurement with the sphygmomanometer and at least one motion threshold value set in advance.

The blood pressure value analysis support apparatus according to the embodiment detects the motion of the subject and determines the reliability based on the statistical value of the motion. When the subject moves during the measurement, the possibility that a valid blood pressure value may not be measured increases. Therefore, by determining the reliability in consideration of the statistical value of the motion, the accuracy of the reliability can be enhanced.

In the blood pressure value analysis support apparatus according to one embodiment,
the at least one motion threshold value includes a first motion threshold value and a second motion threshold value, and
the one-beat reliability determination unit determines the reliability based on a comparison between a statistical value of the motion data over a first unit period having a certain length and the first motion threshold value and a comparison between a statistical value of the motion data over a second unit period shorter than the first unit period and the second motion threshold value.

The "unit period" means a unit period that is a target for determination regarding the motion in the time-series data of blood pressure.

The blood pressure value analysis support apparatus according to the embodiment determines the reliability in consideration of a movement variation over a relatively long period and a movement variation over a relatively short period. Therefore, it is possible to determine the reliability with higher accuracy.

In the blood pressure value analysis support apparatus according to one embodiment, the one-beat reliability determination unit:
detects, in the time-series data of blood pressure, a change point representing a time at which the blood pressure value for each beat changes beyond a predetermined change rate;
acquires a first average blood pressure level by averaging blood pressure values in a continuous period of a predetermined length immediately before the change point for the time-series data of blood pressure, and acquires a second average blood pressure level by averaging blood pressure values in a continuous period of a predetermined length immediately after the change point for the time-series data of blood pressure; and
determines the reliability based on presence or absence of a blood pressure level change at the change point, the presence or absence of the blood pressure level change being determined using a difference between the first average blood pressure level and the second average blood pressure level and a predetermined level threshold value.

The "first average blood pressure level" is typically regarded as a blood pressure level at the start of measurement (normal time).

The blood pressure value analysis support apparatus according to the embodiment determines the reliability based on presence or absence of the blood pressure level change at the change point in the time-series data of blood pressure. The blood pressure level change is caused by, for example, disturbance during the measurement. The disturbance affects data reliability. Therefore, by determining the reliability based on the presence or absence of the blood pressure level change, it is possible to determine the reliability with high accuracy.

In the blood pressure value analysis support apparatus according to one embodiment, the sphygmomanometer includes a plurality of pressure sensor pieces arranged along a direction intersecting an artery by tonometry, and
the one-beat reliability determination unit determines the reliability based on a distribution shape indicating a distribution, among the respective pressure sensor pieces, of the blood pressure value for one beat measured by each of the pressure sensor pieces.

The blood pressure value analysis support apparatus according to the embodiment determines the reliability based on the distribution shape. An arrangement state of the sphygmomanometer with respect to a measurement target site (artery) can be estimated based on the distribution shape. The change in the arrangement state affects the measurement result. Therefore, by determining the reliability based on the distribution shape, it is possible to determine the reliability with high accuracy.

The blood pressure value analysis support apparatus according to one embodiment further includes:

an output data generation unit that generates output data including information indicating time when the blood pressure value for each beat is measured, the reliability, and the disturbance.

In the blood pressure value analysis support apparatus according to the embodiment, various types of information (information indicating measurement time, reliability, and disturbance) can be managed in an organized state by generating the output data. Furthermore, by using the output data, it is also possible to display the various types of information on a display screen or the like. The "display screen" typically refers to a screen of a display device, but may be, for example, a paper surface output by a printer.

The blood pressure value analysis support apparatus according to one embodiment further includes:

an output data generation unit that generates output data including a section start time and a section end time in the valid section.

In the blood pressure value analysis support apparatus according to the embodiment, it is possible to manage information regarding the period of the valid section. In addition, by using the output data, it is also possible to display the period of the valid section in a visually recognizable manner on a display screen or the like.

In another aspect, the blood pressure value analysis support system according to the present disclosure is a blood pressure value analysis support system for supporting analysis of time-series data of blood pressure, the apparatus including:

a sphygmomanometer that measures a blood pressure value for each beat;
a one-beat reliability determination unit that determines reliability of the blood pressure value for each beat, based on information indicating disturbance, in a state including at least a first reliability indicating that the blood pressure value for each beat should be used for analysis and a second reliability indicating that the reliability is lower than the first reliability for time-series data of blood pressure including the blood pressure value for each beat; and
a section setting unit that sets a valid section representing a section which should be used for analysis and an invalid section representing a section which should not be used for analysis for the time-series data of blood pressure based on a determination result of the reliability of the blood pressure value for each beat,
wherein, for the time-series data of blood pressure, the section setting unit includes a section in which the reliability of the blood pressure value for each beat is the first reliability in the valid section, and, on other hand, includes a section in which the reliability of the blood pressure value for each beat is the second reliability in the invalid section, and
wherein the section setting unit changes the invalid section in which a length of a continuous period is less than a preset first threshold value to the valid section.

In the blood pressure value analysis support system of the present embodiments, the sphygmomanometer measures the blood pressure value for each beat. The one-beat reliability determination unit in the blood pressure value analysis support apparatus determines the reliability of the blood pressure value for each beat, based on information indicating disturbance, using at least the first reliability and the second reliability, for the time-series data of blood pressure. For the time-series data of blood pressure, the section setting unit includes a section in which the reliability of the blood pressure value for each beat is the first reliability in the valid section, and, on the other hand, includes a section in which the reliability of the blood pressure value for each beat is the second reliability in the invalid section. Then, the section setting unit changes the invalid section in which a length of a continuous period is less than a preset first threshold value to the valid section. This is because it is considered that there is a little influence on the analysis of the blood pressure variation index that occurs over a relatively long time of several seconds to several tens of seconds, such as a blood pressure surge. Therefore, even if the blood pressure value data having the second reliability which is relatively low in reliability continuously appears over a relatively short period, the blood pressure value data is included in the valid section. Here, as described above, the valid section represents a section to be used for analysis for the time-series data of blood pressure. Therefore, the blood pressure value analysis support apparatus can increase a number of data included in the valid section. Therefore, for example, when detecting the blood pressure variation index such as the blood pressure surge, it is possible to appropriately set the section to be used for analysis of blood pressure data and the section not to be used for analysis in the time-series data of blood pressure.

The blood pressure value analysis support system of one embodiment further includes:

a display device that displays the valid section and/or the reliability in a visually recognizable manner along the time-series data of blood pressure.

In the blood pressure value analysis support system of the embodiment, the display device displays the valid section, the time-series data of blood pressure, and the reliability. Therefore, a doctor or the like can easily determine the portion of the time-series data of blood pressure to be used for analysis by viewing the display screen of the display device. Therefore, it is also possible to shorten the time for confirmation by the doctor or the like.

The blood pressure value analysis support system of one embodiment further includes:

an output data generation unit that generates output data so as to cause a display screen of the display device to display, in a visually recognizable manner, the time-series data of blood pressure and the reliability within the valid section for each of the valid sections and to omit display of the time-series data of blood pressure and the reliability in the invalid section.

In the blood pressure value analysis support system of the embodiment, the display screen of the display device displays the time-series data of blood pressure and the reliability within the valid section for each of the valid sections. On the other hand, the display of the time-series data of blood pressure and the reliability within the invalid section is omitted. Therefore, it is possible to prevent the doctor or the like from visually recognizing the time-series data of blood pressure or the like that should not be used for analysis on the display device, and it is possible to improve the efficiency of confirmation by the doctor.

In another aspect, the blood pressure value analysis support method according to the present disclosure is a blood pressure value analysis support method for supporting analysis of time-series data of blood pressure obtained from a measurement result of a sphygmomanometer, the method including:

determining reliability of a blood pressure value for each beat in a state including at least a first reliability indicating that the blood pressure value for each beat should be used for analysis and a second reliability indicating that the reliability is lower than the first reliability based on information indicating disturbance for time-series data of blood pressure including the blood pressure value for each beat;

setting a valid section representing a section which should be used for analysis and an invalid section representing a section which should not be used for analysis for the time-series data of blood pressure based on a determination result of the reliability of the blood pressure value for each beat;

for the time-series data of blood pressure, including a section in which the reliability of the blood pressure value for each beat is the first reliability in the valid section;

including a section in which the reliability of the blood pressure value for each beat is the second reliability in the invalid section; and changing the invalid section in which a length of a continuous period is less than a preset first threshold value to the valid section.

The blood pressure value analysis support method of the present embodiments includes determining the reliability of the blood pressure value for each beat, based on information indicating disturbance, using at least the first reliability and the second reliability, for the time-series data of blood pressure. The method includes, for the time-series data of blood pressure, including a section in which the reliability of the blood pressure value for each beat is the first reliability in the valid section, and, on the other hand, including a section in which the reliability of the blood pressure value for each beat is the second reliability in the invalid section. Then, the method includes changing the invalid section in which a length of a continuous period is less than a preset first threshold value to the valid section. This is because it is considered that there is a little influence on the analysis of the blood pressure variation index that occurs over a relatively long time of several seconds to several tens of seconds, such as a blood pressure surge. Therefore, even if the blood pressure value data having the second reliability which is relatively low in reliability continuously appears over a relatively short period, the blood pressure value data is included in the valid section. Here, as described above, the valid section represents a section to be used for analysis for the time-series data of blood pressure. Therefore, the blood pressure value analysis support method can increase a number of data included in the valid section. Therefore, for example, when detecting the blood pressure variation index such as the blood pressure surge, it is possible to appropriately set the section to be used for analysis of blood pressure data and the section not to be used for analysis in the time-series data of blood pressure.

In still another aspect, the program of the present disclosure is a program for causing a computer to execute a blood pressure value analysis support method.

The blood pressure value analysis support method can be carried out by causing a computer to execute the program of the disclosure.

Effects of the Embodiments

As is clear from the above, according to the blood pressure value analysis support apparatus, the blood pressure value analysis support system, and the blood pressure value analysis support method of the present disclosure, for example, when detecting the blood pressure variation index such as a blood pressure surge, it is possible to suppress reduction in number of data which is a target for the detection. Further, the blood pressure value analysis support method can be carried out by causing a computer to execute the program of the disclosure.

What is claimed is:

1. A blood pressure value analysis support apparatus for supporting analysis of time-series data of blood pressure obtained from a measurement result of a sphygmomanometer, the apparatus comprising:
a one-beat reliability determination unit configured to determine reliability of a blood pressure value for each beat, based on information indicating disturbance, in a state including at least a first reliability indicating that the blood pressure value for each beat should be used for analysis and a second reliability indicating that the reliability is lower than the first reliability for time-series data of blood pressure including the blood pressure value for each beat; and
a section setting unit configured to set a valid section representing a section which is used for analysis and an invalid section representing a section which is not used for analysis for the time-series data of blood pressure based on a determination result of the reliability of the blood pressure value for each beat, wherein
for the time-series data of blood pressure, the section setting unit includes a section in which the reliability of the blood pressure value for each beat is the first reliability in the valid section, and includes a section in which the reliability of the blood pressure value for each beat is the second reliability in the invalid section,
the section setting unit is configured to change the invalid section in which a length of a continuous period is less than a preset first threshold value to the valid section, and
the apparatus includes a display device configured to display the valid section and/or the reliability in a visually recognizable manner along the time-series data of blood pressure, wherein
the apparatus further comprises an operation device configured to receive a user instruction, the display device being configured to display the valid section in response to the user instruction being received by the operation device.

2. The blood pressure value analysis support apparatus according to claim 1, wherein
the section setting unit is configured to change the valid section in which a length of a continuous period is less than a preset second threshold value to the invalid section.

3. The blood pressure value analysis support apparatus according to claim 1, wherein
the one-beat reliability determination unit is configured to determine the reliability based on a maximum blood pressure value of a blood pressure for each beat and a preset maximum blood pressure threshold value.

4. The blood pressure value analysis support apparatus according to claim 3, wherein
the one-beat reliability determination unit is configured to determine the reliability based also on a minimum blood pressure value of the blood pressure for each beat and a preset minimum blood pressure threshold value.

5. The blood pressure value analysis support apparatus according to claim 3, wherein
the one-beat reliability determination unit is configured to determine the reliability based also on a pulse pressure that is a difference between the maximum blood pressure value and the minimum blood pressure value of the blood pressure for each beat and a preset pulse pressure threshold value.

6. The blood pressure value analysis support apparatus according to claim 3, wherein
the one-beat reliability determination unit is configured to determine the reliability based also on a beat time which is one cycle of the blood pressure of one beat and a preset beat time threshold value.

7. The blood pressure value analysis support apparatus according to claim 1, wherein
the one-beat reliability determination unit is configured to determine the reliability based on a statistical value of motion data indicating a motion of a subject during measurement with the sphygmomanometer and at least one motion threshold value set in advance.

8. The blood pressure value analysis support apparatus according to claim 7, wherein
the at least one motion threshold value includes a first motion threshold value and a second motion threshold value, and
the one-beat reliability determination unit is configured to determine the reliability based on a comparison between a statistical value of the motion data over a first unit period having a certain length and the first motion threshold value and a comparison between a statistical value of the motion data over a second unit period shorter than the first unit period and the second motion threshold value.

9. The blood pressure value analysis support apparatus according to claim 1, wherein
the one-beat reliability determination unit is configured to:
detect, in the time-series data of blood pressure, a change point representing a time at which the blood pressure value for each beat changes beyond a predetermined change rate,
acquire a first average blood pressure level by averaging blood pressure values in a continuous period of a predetermined length immediately before the change point for the time-series data of blood pressure, and acquire a second average blood pressure level by averaging blood pressure values in a continuous period of a predetermined length immediately after the change point for the time-series data of blood pressure, and
determine the reliability based on presence or absence of a blood pressure level change at the change point, the presence or absence of the blood pressure level change being determined using a difference between the first average blood pressure level and the second average blood pressure level and a predetermined level threshold value.

10. The blood pressure value analysis support apparatus according to claim 1, wherein
the sphygmomanometer includes a plurality of pressure sensor pieces arranged along a direction intersecting an artery, the pressure sensor pieces operating by tonometry, and
the one-beat reliability determination unit is configured to determine the reliability based on a distribution shape indicating a distribution, among the respective pressure sensor pieces, of the blood pressure value for one beat measured by each of the pressure sensor pieces.

11. The blood pressure value analysis support apparatus according to claim 1, which further comprises:
an output data generation unit configured to generate output data including information indicating the time when the blood pressure value for each beat is measured, the reliability, and the disturbance.

12. The blood pressure value analysis support apparatus according to claim 1, which further comprises:
an output data generation unit configured to generate output data including a section start time and a section end time in the valid section.

13. A blood pressure value analysis support system for supporting analysis of time-series data of blood pressure, the system comprising:
a sphygmomanometer configured to measure a blood pressure value for each beat;
a one-beat reliability determination unit configured to determine reliability of the blood pressure value for each beat, based on information indicating disturbance, in a state including at least a first reliability indicating that the blood pressure value for each beat should be used for analysis and a second reliability indicating that the reliability is lower than the first reliability for time-series data of blood pressure including the blood pressure value for each beat; and
a section setting unit configured to set a valid section representing a section which should be used for analysis and an invalid section representing a section which should not be used for analysis for the time-series data of blood pressure based on a determination result of the reliability of the blood pressure value for each beat, wherein
for the time-series data of blood pressure, the section setting unit includes a section in which the reliability of the blood pressure value for each beat is the first reliability in the valid section, and includes a section in which the reliability of the blood pressure value for each beat is the second reliability in the invalid section,
the section setting unit is configured to change the invalid section in which a length of a continuous period is less than a preset first threshold value to the valid section,
the system further comprises a display device configured to display the valid section and/or the reliability in a visually recognizable manner along the time-series data of blood pressure, and
the system further comprises an operation device configured to receive a user instruction, the display device being configured to display the valid section in response to the user instruction being received by the operation device.

14. The blood pressure value analysis support system according to claim 13, which further comprises:
an output data generation unit configured to generate output data so as to cause a display screen of the display device to display, in a visually recognizable manner, the time-series data of blood pressure and the reliability within the valid section for each of the valid sections and to omit display of the time-series data of blood pressure and the reliability in the invalid section.

15. A blood pressure value analysis support method for supporting analysis of time-series data of blood pressure obtained from a measurement result of a sphygmomanometer,
the method comprising:
determining reliability of a blood pressure value for each beat in a state including at least a first reliability indicating that the blood pressure value for each beat should be used for analysis and a second reliability indicating that the reliability is lower than the first reliability based on information indicating disturbance for time-series data of blood pressure including the blood pressure value for each beat;
setting a valid section representing a section which is used for analysis and an invalid section representing a section which is not used for analysis for the time-series data of blood pressure based on a determination result of the reliability of the blood pressure value for each beat;
for the time-series data of blood pressure, including a section in which the reliability of the blood pressure value for each beat is the first reliability in the valid section;
including a section in which the reliability of the blood pressure value for each beat is the second reliability in the invalid section;
changing the invalid section in which a length of a continuous period is less than a preset first threshold value to the valid section;
transmitting the valid section and/or the reliability to a display device configured to display the valid section in a visually recognizable manner along the time-series data of blood pressure, and
receiving, via an operation device, a user instruction, the display device being configured to display the valid section in response to the user instruction being received by the operation device.

* * * * *